(12) United States Patent
Stone

(10) Patent No.: US 7,860,654 B2
(45) Date of Patent: Dec. 28, 2010

(54) SIMULATION METHOD AND APPARATUS FOR DETERMINING SUBSIDENCE IN A RESERVOIR

(75) Inventor: Terry Wayne Stone, Kingsworthy (GB)

(73) Assignee: Schlumberger Technology Corporation, Houston, TX (US)

( * ) Notice: Subject to any disclaimer, the term of this patent is extended or adjusted under 35 U.S.C. 154(b) by 1078 days.

(21) Appl. No.: 11/432,080

(22) Filed: May 11, 2006

(65) Prior Publication Data

US 2008/0288172 A1 Nov. 20, 2008

Related U.S. Application Data

(60) Division of application No. 10/832,129, filed on Apr. 26, 2004, now Pat. No. 7,177,764, which is a continuation-in-part of application No. 10/070,510, filed as application No. PCT/GB01/03042 on Jul. 6, 2001, now Pat. No. 6,766,255.

(30) Foreign Application Priority Data

Jul. 14, 2000 (GB) ................................. 0017227.0

(51) Int. Cl.
*G01V 3/00* (2006.01)
*G06G 7/48* (2006.01)
*E21B 49/00* (2006.01)
*E21B 47/00* (2006.01)

(52) U.S. Cl. .......................... 702/2; 703/10; 73/152.05; 166/250.02

(58) Field of Classification Search ................. 702/1–2, 702/11–14, 6; 703/5–6, 9–10; 73/152.18, 73/152.01, 152.02, 152.05; 367/14, 21; 166/244.1, 166/250.01, 250.02; 175/40, 50; 324/323
See application file for complete search history.

(56) References Cited

U.S. PATENT DOCUMENTS 5,621,169 A * 4/1997 Harris et al. ............. 73/152.18

OTHER PUBLICATIONS

Daim et al., A Preconditioned Conjugate Gradient Based Algorithm for Coupling Geomechanical-Reservoir Simulations, 2002, Oil & Gas Science and technology-Rev.IFP, vol. 57, No. 5, pp. 515-523.*
Longuemare et al., Geomechanical in Reservoir Simulation: Overview of Coupling Methods and Field Case Study, 2002, Oil & Gas Science and Technology-Rev. IFP, vol. 57, No. 5, pp. 471-483.*

(Continued)

*Primary Examiner*—Michael P Nghiem
*Assistant Examiner*—Toan M Le
(74) *Attorney, Agent, or Firm*—Robert P. Lord; Jim Patterson; Bryan Galloway

(57) ABSTRACT

A method for reservoir simulation that includes applying fraction boundary conditions at a surface of a grid representing the subterranean reservoir, finding a rock state, representing initial rock displacements and porosity in the grid, that satisfies a first equation of $V^e NTG\phi^e = V^o NTG\phi^o = PV^o$, initializing the grid based on the rock state to generate an initialized grid, determining a set of rock displacements based on the initialized grid, and generating a simulation result based on the rock displacements, where an operation in the subterranean reservoir is performed based on the simulation result.

12 Claims, 18 Drawing Sheets

OTHER PUBLICATIONS

Minkoff et al., Coupled Fluid Flow and Geomechanical Deformation Modeling, 2003, Journal of Petroleum Science and Engineering 38, pp. 37-56.*
Chen et al., Coupled Fluid Flow and Geomechanics in Reservoir Study-I. Theory and Governing Equations, 1995, SPE 30752, pp. 507-519.*
Chin et al., Fully Coupled analysis of Improved Oil Recovery by Reservoir Compaction, 1999, SPE 56753, pp. 1-10.*
Chen et al., Coupling Fluid-Flow and Geomechanics in Dual-Porosity Modeling of Naturally Fractured Reservoirs, 1997, SPE 38884, pp. 419-433.*
Gutierrez et al., The Role of geomechanics in Reservoir Simulation, 1998, SPE/ISRM 47392, pp. 439-448.*
Burbey, T., State of Subsidence Modeling Within the U.S. Geological Survey, Feb. 14-16, 1995, U.S. Geological Survey Subsidence Interest Group Conference, Las Vegas, Nevada, pp. 15-19.*
IBM Technical Disclosure Bulletin, Mathematical Model of Subsoil Relevant of Subsidence, Apr. 1971, vol. 13, Issue 11, pp. 1-4.*
Cassiani et al., Gas Extraction and Risk of Subsidence: the Case of the Northern Adriatic Gas Fields, Technical Issues, 1998, SPE 46808, pp. 1-9.*
Stone et al., Coupled Geomechanical Simulation of Stress Dependent Reservoirs, Feb. 3, 2003, SPE 79697.
Hansen, K. S., Prats, M., Chan, C.K., "Finite-element modeling of depletion-induced reservoir compaction and surface subsidence in the South Belridge oil field, California", SPE 26074, presented at the Western Regional Meeting, Anchorage, Alaska, U.S.A., May 26-28, 1993.
Berumen, S., Cipolla, C., Finkbeiner, T., Wolhart, S., Rodriguez, F., "Integrated reservoir geomechanics techniques in the Burgos Basin, Mexico: An improved gas reservoirs management", SPE 59418 presented at the 2000 SPE Asia Pacific Conference on Integrated Modelling for Asset Management, Yokohama, Japan, Apr. 25-26, 2000.
Kojic, M., Cheatham, J. B., "Theory of plasticity of porous media with fluid flow", SPE 4394, printed in Transactions, vol. 257, Jun. 1974.
Kojic, M., Cheatham, J. B., "Analysis of the influence of fluid flow on the plasticity of porous rock under an axially symmetric punch", SPE 4243, printed in Transactions, vol. 257, Jun. 1974.
Settari, A., Walters, D. A., "Advances in coupled geomechanical and reservoir modeling with applications to reservoir compaction", SPE 51927 presented at the 1999 SPE Reservoir Simulation Symposium, Houston, Texas, Feb. 14-17, 1999.
Heifer, K. J., Koutsabeloulis, N. C., Wong, S. K., "Coupled geomechanical, thermal and fluid flow modelling as an aid to improving waterflood sweep efficiency", Eurock '94, Balkema, Rotterdam, Aug. 29-31, 1994.
Gutierrez, M., and Lewis, R. W., "The role of geomechanics in reservoir simulation", Proceedings Eurock '98, vol. 2, 439-448, Jul. 8-10, 1998.
Geertsma, J., "Land subsidence above compacting oil and gas reservoirs", JPT, 734-744, Jun. 1973.

Holt, R.E., "Permeability reduction induced by a nonhydrostatic stress field", SPE Formation Evauation, 5, 444-448, Dec. 1990.
Rhett, W. and Teufel, L. W., "Effect of reservoir stress path on compressibility and permeability of sandstones", presented at SPE 67th Annual Technical conference and Exhibition, SPE 24756, Washington, D.C., Oct. 4-7, 1992.
Ferfera, F. R., Sarda, J. P., Bouteca, M., and Vincke, O., "Experimental study of monophasic permeability changes under various stress paths", Proceedings of 36th U. S. Rock Mechanics Symposium, Kim (ed.), Elsevier, Amsterdam, Jan. 1997.
Teufel, L. W., and Rhett, W., "Geomechanical evidence for shear failure of chalk during production of the Ekofisk field", SPE 22755 presented at the 1991 SPE 66th Annual Technical Conference and Exhibition, Dallas, Oct. 6-9, 1991.
Naccache, P. F. N., "A fully implicit thermal simulator", SPE 37985 presented at the SPE Reservoir Simulation Symposium, Jun. 8-11, 1997.
Davies, J. P., Davies, D. K., "Stress-dependent permeability: characterization and modeling", SPE 56813 presented at the 1999 SPE Annual Technical Conference and Exhibition held in Houston, Texas, Oct. 3-6, 1999.
Yale, D. P., Crawford, B., "Plasticity and permeability in carbonates: dependence on stress path and porosity", SPE/ISRM 47582, presented at the SPE/ISRM Eurock '98 Meeting, Trondheim, Norway, Jul. 8-10, 1998.
Appleyard, J. R., Cheshire, I. M., "Nested factorization", SPE 12264 presented at the SPE Reservoir Simulation Symposium, San Francisco, Nov. 15-18, 1983.
Settari, A., Mourits, F. M., "A coupled reservoir and geomechanical simulation system", SPE 50939, SPE Journal, 219-226, Sep. 1998.
Abaqus Theory Manual, Hibbitt, Karlsson & Sorensen, Inc., May 16, 1995.
Corapcioglu, M.Y., Bear, J., "Land Subsidence", presented at the NATO Advanced Study Institute on Mechanics of Fluids in Porous Media, Newark Delaware, U.S. A., Jul. 18-27, 1982, 116 pages.
Demirdzic, I., Martinovic, D., "Finite volume method for thermo-elasto-plastic stress analysis," Computer Method in Applied Mechanics and Engineering 109, Sep. 15, 1992, 19 pages.
Demirdzic, I., Muzaferija, S., "Finite volume method for stress analysis in complex domains," International Journal for Numerical Methods in Engineering, vol. 37, Jan. 10, 1994, 16 pages.
Chou, C.C., Pagano, N. J., "Elasticity, Tensor, Dyadic and Engineering Approaches," Chapter 13, "Displacement Functions and Stress Functions" pp. 266-284; Dover Publications, Inc., New York, Jan. 1967, 12 pages.
Budynas, R.G., "Advanced Strength and Applied Stress Analysis: Second Edition," Chapter 1, "Basic Concepts of Force, Stress, Strain, and Displacement" pp. 1-45; McGraw-Hill Book Co., Jan. 1999, 47 pages.
Stone, "Fully Coupled Geomechanics in a Commercial Reservoir Simulator", SPE European Petroleum Conference, Paris, France, Oct. 24-25, 2000, SPE 65107.

* cited by examiner

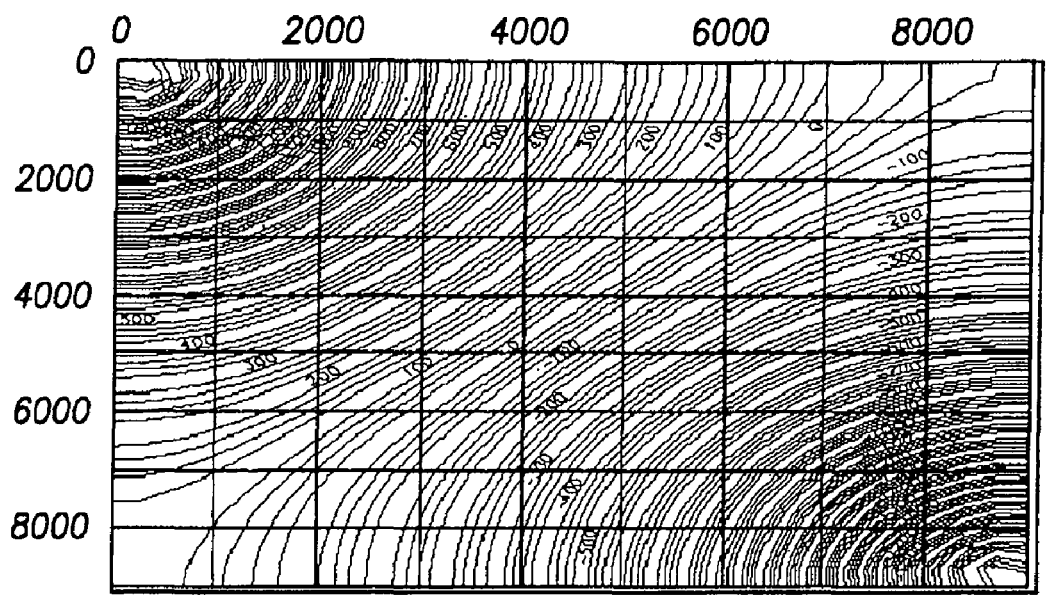
FIG.4a1
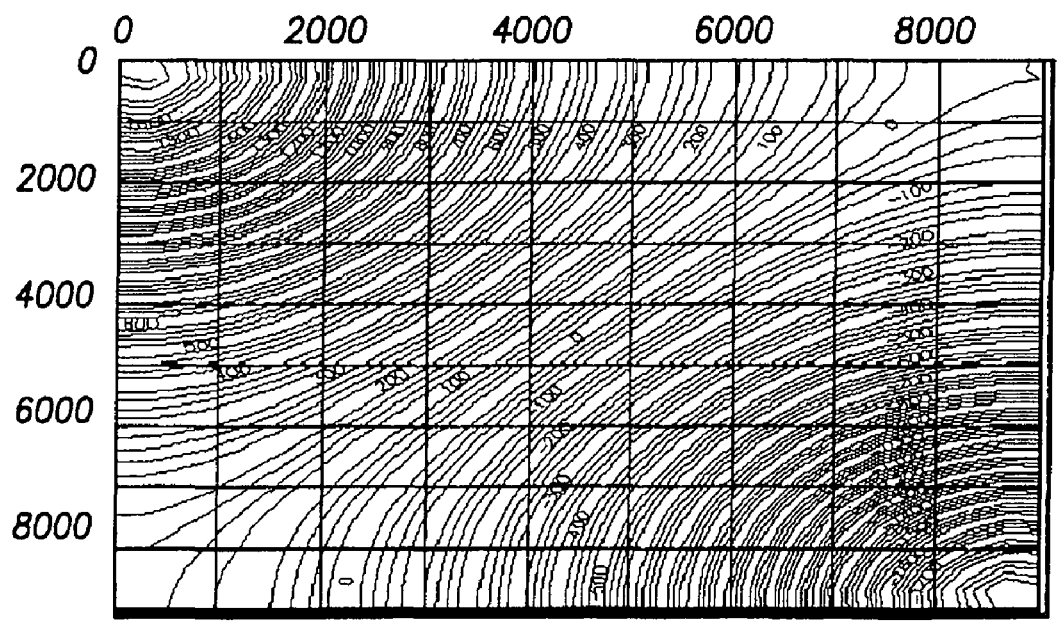
FIG.4a2

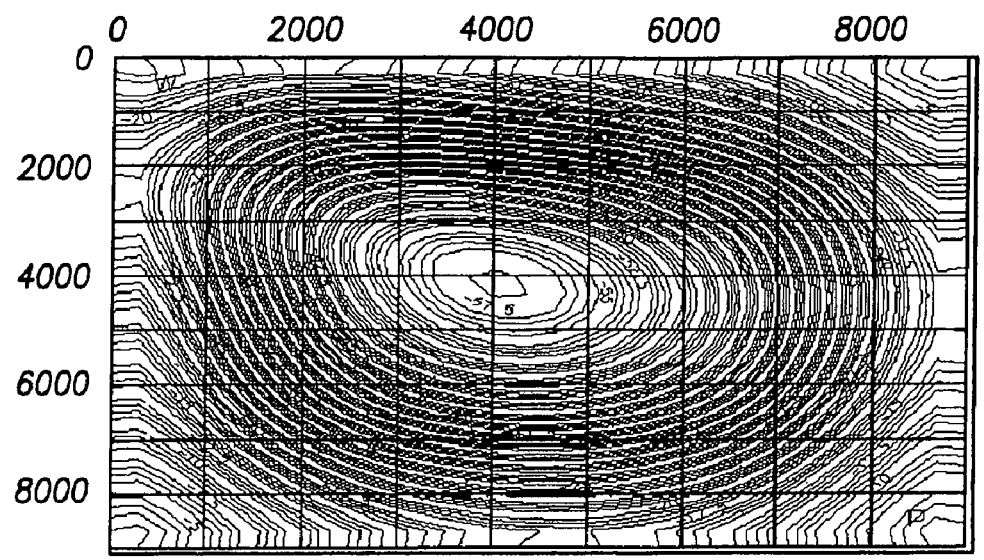
FIG.4b1
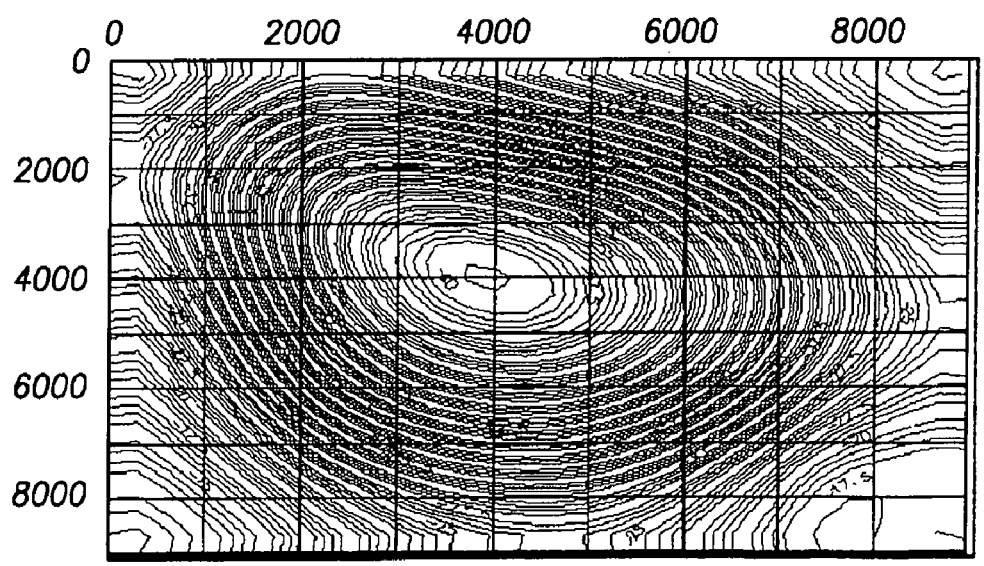
FIG.4b2

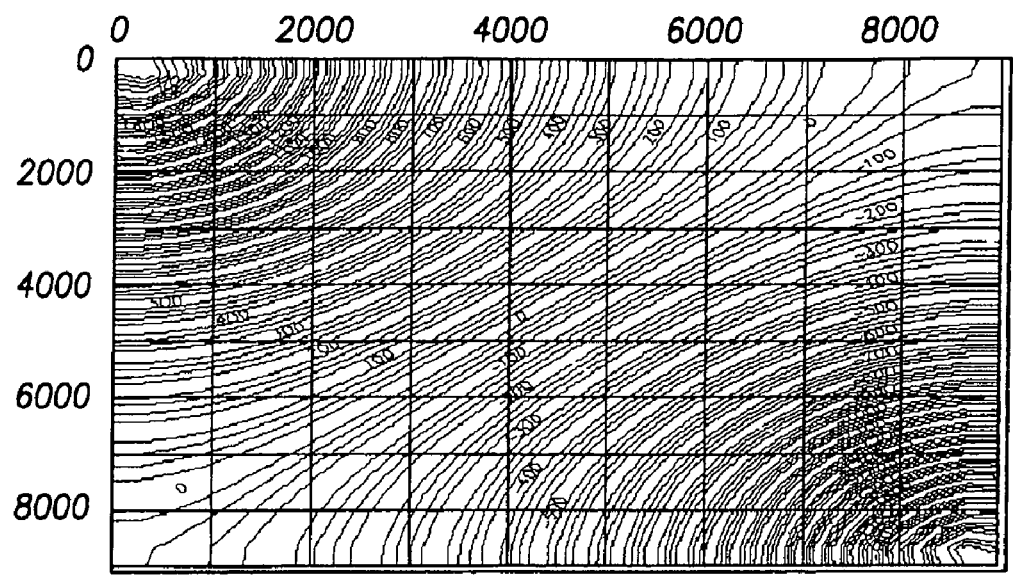
FIG.4c1
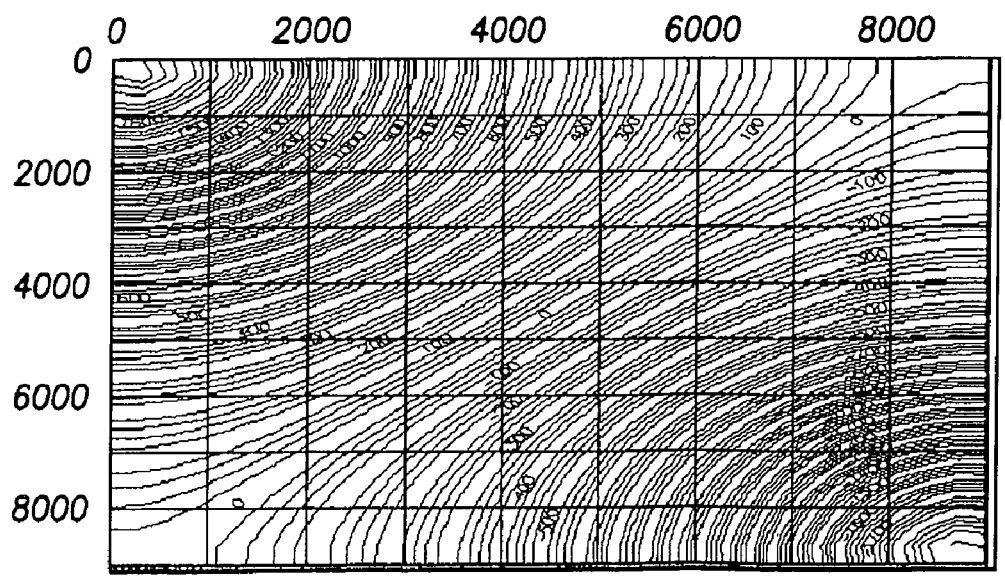
FIG.4c2

| SIMULATION PARAMETERS USED IN COMPARING ABAQUS AND RESERVOIR SIMULATOR PREDICTIONS | | | |
| --- | --- | --- | --- |
| CASE | GRID DIMENSIONS | YOUNG'S MODULUS | POISSON'S RATIO |
| 1 | 9x1x1 | 10 GPa | 0.4 |
| 2 | 9x1x1 | .1 GPa | 0.3 |
| 3 | 4x1x3 | 10 GPa | 0.4 |
| 4 | 4x1x3 | .1 GPa | 0.3 |
| 5 | 9x1x3 | 10 GPa | 0.4 |
| 6 | 9x1x3 | .1 GPa | 0.3 |

SIMULATION METHOD AND APPARATUS FOR DETERMINING SUBSIDENCE IN A RESERVOIR

CROSS REFERENCE TO RELATED APPLICATION

This Application is a Divisional Application of application Ser. No. 10/832,129 filed Apr. 26, 2004 entitled Simulation Method and Apparatus for Determining Subsidence in a Reservoir, now U.S. Pat. No. 7,177,764, which is a Continuation-in-Part of application Ser. No. 10/070,510, section 371 filing date Aug. 15, 2002, entitled Method of Determining Subsidence in a Reservoir, now U.S. Pat. No. 6,766,255, associated with an International Application PCT/GB01/03042 filed Jul. 6, 2001, now abandoned.

BACKGROUND OF THE INVENTION

The subject matter of the present invention relates to a reservoir simulator including a parameter determination software which determines displacement parameters representing subsidence in an oilfield reservoir. More particularly, the present invention relates to methods for calculating the three dimensional stress field around a single or a series of geological faults, an equilibration technique that may be used to initiate the stresses and pore volumes, and methods to allow elastic or non-elastic change in rock pore volume to be coupled to fee stress calculation that provide an alternative to more complex plastic failure models.

There are many recent reports of geomechanical modeling being used predictively for evaluation of alternative reservoir development plans. In the South Belridge field, Kern County, Calif., Hansen el al[1] calibrated finite-element models of depletion-induced reservoir compaction and surface subsidence with observed measurements. The stress model was then used predictively to develop strategies to minimize additional subsidence and fissuring as well as to reduce axial compressive type casing damage. Berumen et al[2] developed an overall geomechanical model of the Wilcox sands in the Arcabuz-Culebra field in the Burgos Basin, northern Mexico. This model, combined with hydraulic fracture mapping together with fracture and reservoir engineering studies, was used to optimize fracture treatment designs and improve the planning of well location and spacing.

The subject of fluid flow equations which are solved together with rock force balance equations has been discussed extensively in the literature. Kojic and Cheatham[3,4] present a lucid treatment of the theory of plasticity of porous media with fluid flow. Both the elastic and plastic deformation of the porous medium containing a moving fluid is analyzed as a motion of a solid-fluid mixture. Corapcioglu and Bear[5] present an early review of land subsidence modeling and then present a model of land subsidence as a result of pumping from an artesian aquifer.

Demirdzic et al[6,7] have advocated the use of finite volume methods for numerical solution of the stress equations both in complex domains as well as for thermo-elastic-plastic problems.

A coupling of a conventional stress-analysis code with a standard finite difference reservoir simulator is outlined by Settari and Walters[8]. The term "partial coupling" is used because the rock stress and flow equations are solved separately for each time increment. Pressure and temperature changes as calculated in the reservoir simulator are passed to the geomechanical simulator. Updated strains and stresses are passed to the reservoir simulator which then computes porosity and permeability. Issues such as sand production, subsidence, compaction that influence rock mass conservation arc handled in the stress-analysis code. This method will solve the problem as rigorously as a fully coupled (simultaneous) solution if iterated to full convergence. An explicit coupling, i.e. a single iteration of the stress model, is advocated for computational efficiency.

The use of a finite element stress simulator with a coupled fluid flow option is discussed by Heffer et al[9] and by Gutierrez and Lewis[10].

Standard commercial reservoir simulators use a single scalar parameter, the pore compressibility, as discussed by Geertsma[11] to account for the pressure changes due to volumetric changes in the rock. These codes generally allow permeability to be modified as a function of pore pressure through a table. This approach is not adequate when the flow parameters exhibit a significant variation with rock stress. Holt[12] found that for a weak sandstone, permeability reduction was more pronounced under non-hydrostatic applied stress, compared with, the slight decrease measured under hydrostatic loading. Rhett and Teufel[13] have shown a rapid decline in matrix permeability with increase in effective stress. Ferfera et al[14] worked with a 20% porosity sandstone and found permeability reductions as high as 60% depending on the relative influence of the mean effective stress and the differential stress. Teufel et al[15] and Teufel and Rhett[16] found, contrary to the assumption that permeability will decrease with reservoir compaction, and porosity reduction, that shear failure had a beneficial influence on production through an increase in the fracture density.

Finite element programs are in use that include a method to calculate the stress field around a fault or discontinuity in a porous medium. Similarly, stress equilibration techniques exist in software such as finite element programs. However, so far as is known, such programs cannot calculate the stress field around a fault or discontinuity in the presence of multiphase (wherein the number of phases is between 1 and 3) flowing fluid with a full PVT description of each phase where the flowing fluid residual equations (fluid component conservation equations) are simultaneously solved with the rock stress equations (rock momentum conservation equations) and a residual equation describing rock volume or mass conservation.

Rock stress is a function of rock displacement. Rock displacement can be represented as rock strain, an example of which is set out below in equation (19). For infinitesimally small displacements, rock usually behaves elastically according to Hooke's law (see Fjaer, E., Holt, R. M., Horsrud, P, Arne, M. R., Risnes, R., "Petroleum Related Rock Mechanics" Elsevier Science, Netherlands, 1992), which is a linear relation between rock stress and strain. However under a sufficient loading force, a rock may begin to fail. Failure includes phenomena such as cracking, crushing and crumbling. There are several models that represent this failure, the most common in soil mechanics being Mohr-Coulomb and Drucker-Praeger (Id.). These models are highly nonlinear and often difficult to compute. This phenomenon is called plasticity. Often the character of the material changes, perhaps due to re-arrangement of grains in the metal or soil. In a porous medium, elastic or plastic deformation will produce a change in pore volume. A change in pore volume will significantly influence the pore pressure.

Several options are available in a standard reservoir simulator to model compaction of tire rock. These options are generally presented as tabulated compaction curves as a function of pore pressure. Most rocks will compact to some extent as the stress on the rock is increased and when the fluid pressure falls. Some rocks, typically chalks, will exhibit additional compaction when water contacts oil bearing rock, even at constant stress. This behavior could have a significant effect on the performance of a water flood as it adds significant energy to the reservoir. These tabulated compaction curves can also include hysteresis where a different stress path is taken depending on whether the pressure is increasing or decreasing. These paths are also called deflation and reflation curves. However, there is a need for a simpler, alternative method that allows coupling elastic or non-elastic change in rock pore volume to the stress calculation

SUMMARY OF THE INVENTION

Oil recovery operations are seeing increased use of integrated geomechanical and reservoir engineering to help manage fields. This trend is partly a result of newer, more sophisticated measurements that are demonstrating that variations in reservoir deliverability are related to interactions between changing fluid pressures, rock stresses and flow parameters such as permeability. Several recent studies, for example, have used finite-element models of the rock stress to complement the standard reservoir simulation.

This specification discusses current work pertaining to fully and partially coupling geomechanical elastic/plastic rock stress equations to a commercial reservoir simulator. This finite difference simulator has black-oil, compositional and thermal modes and all of these are available with the geomechanics option. In this specification, the implementation of the aforementioned stress equations into the code, hereinafter called the 'Parameter Determination Software,' is discussed. Some work on benchmarking against an industry standard stress code is also shown as well as an example of the coupled stress/fluid flow. The goal in developing this technology within the simulator is to provide a stable, comprehensive geomechanical option that is practical for large-scale reservoir simulation.

The present invention improves on existing methods to calculate stress around a fault while computing a transient coupled rock stress/fluid flow prediction by enforcing strict conservation of momentum, both normally and in the two shear directions around a fault discontinuity. The method is based on the residual technique discussed herein and accounts for the presence of multi-phase flow where the number of flowing fluid phases is between 1 and 3 and where properties of each fluid phase can be specified using either black-oil, compositional or thermal PVT relationships.

This method of the present invention improves on equilibration or initialization methods, such as those found in finite element codes (e.g. ABAQUS), by honoring the initial pore volumes and fluids in place after application of the traction or other boundary conditions. There may be multiple (up to 3) flowing fluid phases present where it is important for each phase to have its fluid properties described using black-oil, compositional or thermal techniques.

The method improves on the traditional method of calculating a non-linear, plastic description of rock failure by allowing a change in pore volume as a function of pore pressure, including effects of water saturation and hysteresis, while computing a transient coupled rock stress/fluid flow prediction. It is relatively simple to evaluate, is stable under large changes in pore volume, and allows the presence of multiple (up to 3) flowing fluid phases where each phase can have its fluid properties described using black-oil, compositional or thermal techniques Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from tire detailed description of the preferred embodiment presented hereinbelow, and the accompanying drawings, which are given by way of illustration only and are not intended to be limitative of the present invention, and wherein:

FIGS. 4$a$1, 4$a$2, 4$b$1, 4$b$2, 4$c$1, and 4$c$2 illustrate total normal stress in Mid X-Y plane;

FIG. 4$d$ illustrates Table 1, and Table 1 further illustrates simulation parameters used in comparing ABAQUS and Reservoir Simulator Predictions);

FIGS. 11$b$, 11$c$ and 11$d$ illustrate examples of a vertical plane in a grid in which numerous faults are defined (FIG. 11$b$), and the same grid in one of the horizontal planes (FIG. 11$c$), defining a throw in the gridding at a fault plane where cells on one side are staggered vertically relative to those on the other side, and several intersecting faults in both horizontal coordinate directions can be seen in FIG. 11$d$;

FIGS. 11$e$, 12 and 13 illustrate the FLOGRID® software and the ECLIPSE® simulator software (Schlumberger Technology Corporation) and the generation of 'simulation results' which are displayed on a 3-D viewer;

DESCRIPTION OF THE INVENTION

Elastic Stress Equations

Steady state "rock momentum balance equations" in the x, y and z directions can be written as[17]:

$$\frac{\partial \sigma_x}{\partial x} + \frac{\partial \tau_{yx}}{\partial y} + \frac{\partial \tau_{zx}}{\partial z} + F_x + P_x = 0 \quad (1)$$

$$\frac{\partial \sigma_y}{\partial y} + \frac{\partial \tau_{xy}}{\partial x} + \frac{\partial \tau_{zy}}{\partial z} + F_y + P_y = 0$$

$$\frac{\partial \sigma_z}{\partial z} + \frac{\partial \tau_{xz}}{\partial x} + \frac{\partial \tau_{yz}}{\partial y} + F_s + P_z = 0$$

Here F is the body force, P is the interaction force between the solid and the fluid. This interaction force is discussed further below.

The elastic normal stresses σ and shear stresses τ can be expressed in terms of strains, $\epsilon$ and $\gamma$, as:

$$\sigma_x = 2G\epsilon_x + \lambda(\epsilon_x + \epsilon_y + \epsilon_z)$$

$$\sigma_y = 2G\epsilon_y + \lambda(\epsilon_x + \epsilon_y + \epsilon_z)$$

$$\sigma_z = 2G\epsilon_z + \lambda(\epsilon_x + \epsilon_y + \epsilon_z)$$

$$\tau_{xy} = G\gamma_{xy}$$

$$\tau_{yz} = G\gamma_{yz}$$

$$\tau_{zx} = G\gamma_{zx} \quad (2)$$

Constants G, also known as the modulus of rigidity, and λ are Lamé's constants. They are functions of Young's modulus, E, aid Poisson's ratio, ν. Strains $\epsilon_{x,y,z}$ are defined in terms of displacements in the x,y,z directions, namely u, v, and w. Thus $$\varepsilon_x = \frac{\partial u}{\partial x} \quad (3)$$

$$\varepsilon_y = \frac{\partial v}{\partial y}$$

$$\varepsilon_z = \frac{\partial w}{\partial z}$$

$$\gamma_{xy} = \frac{\partial u}{\partial y} + \frac{\partial v}{\partial x}$$

$$\gamma_{yz} = \frac{\partial v}{\partial z} + \frac{\partial w}{\partial y}$$

$$\gamma_{zx} = \frac{\partial w}{\partial x} + \frac{\partial u}{\partial z}$$

Within the simulator, tire rock force is calculated in units of Newtons, Ibf, or dynes depending on whether the user has chosen mks, field or cgs units for the simulation.

Gridding

Before returning to a discussion of the fluid component mass conservation and rock mass conservation equations, the special gridding for the rock force (momentum) balance equations is briefly outlined.

To implement these rock momentum balance equations in a finite difference simulator, separate control volumes for balancing the force are used in each orthogonal grid direction. These control volumes are staggered in each of the coordinate directions.

Figure 1:
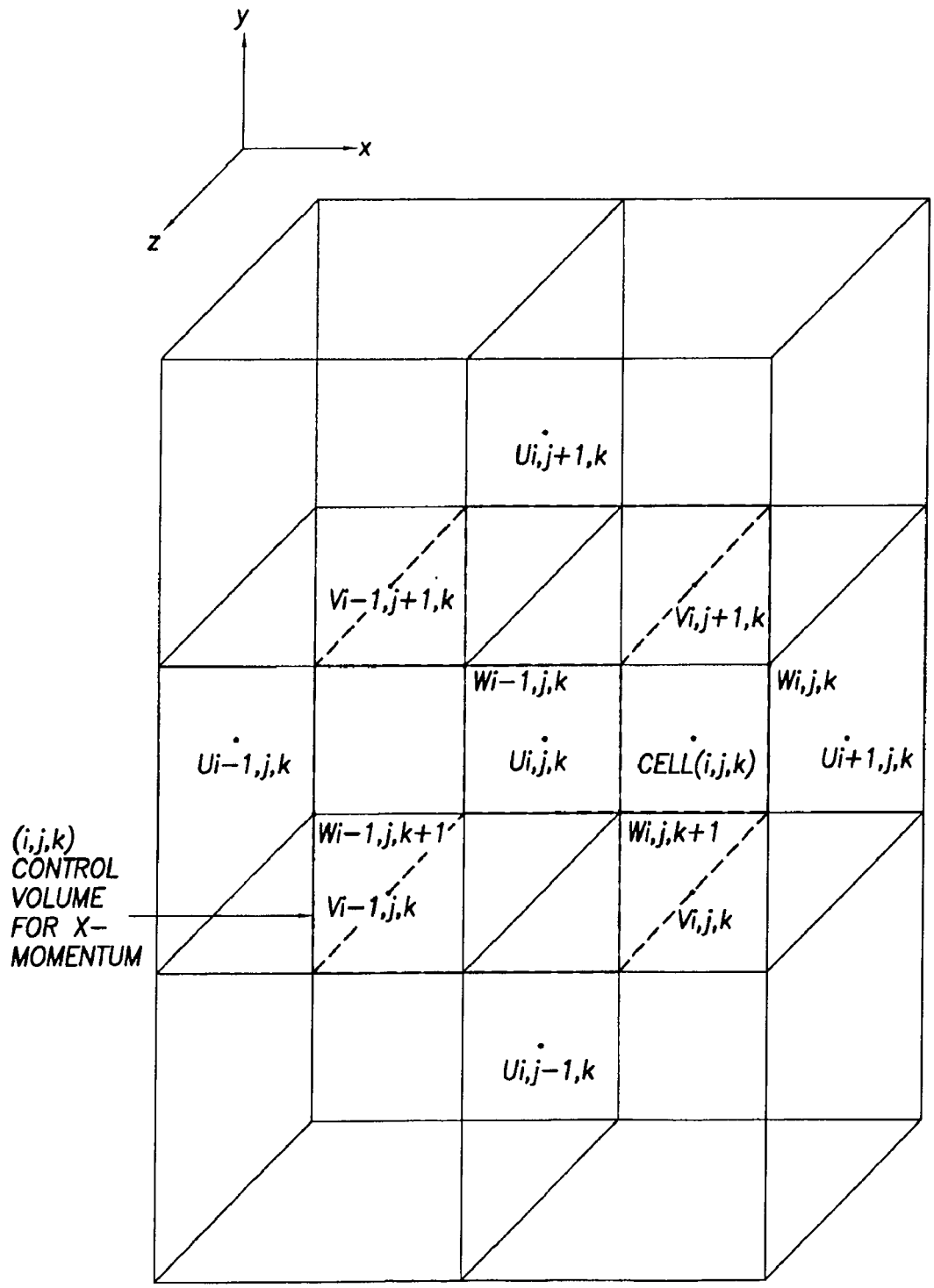
FIG. 1 illustrates control volume (light gray grid) for Rock Force Balance.

In FIG. 1, an x-direction rock force balance control volume is shown. Also shown in this Figure is the finite difference discretization used. The grid with the solid lines in this figure is the standard reservoir simulation grid which are control volumes for fluid component and rock mass conservation. Rock displacements u, v and w are defined on the faces of this grid. Rock momentum control volumes in a particular coordinate direction are centered on the rock displacement in that direction. In FIG. 1 is shown the x-momentum control volume (grid with dashed lines) in the center of which is the x-direction rock displacement, u, which is defined on the face between two control volumes for mass conservation (black grid). Similar rock momentum control volumes are set up in the y and z directions around v and w, the y and z rock displacements.

This grid is fixed in time. Rock will flow elastically or plastically in the mass conservation grid. A correction term to Darcy's law that accounts for the extra transport of fluid component mass into an adjoining mass conservation cell due to rock movement into that cell can be calculated in the simulator and is discussed below.

We have found the staggered gridding to be the most natural for differencing purposes and for setting of boundary conditions. It is also the most accurate because it achieves second order accuracy when calculating the normal stresses and mixed first/second order accuracy when calculating the shear stresses. To illustrate, if the user has input the more general stiffness matrix[18], $$\vec{S}_N,$$

instead of the Young's moduli and Poisson ratios, then the differenced normal stress on the x+ side of fee rock momentum balance control volume in FIG. 1 can be written $$\sigma_{x+} = S_{N_x S_{x+}} \cdot \varepsilon_{x_{x+}} + S_{N_{xy}} \cdot \varepsilon_{y_{x+}} + S_{N_{x+}} \cdot \varepsilon_{z_{x+}} \quad (4)$$

$$\varepsilon_{x_{x+}} = \frac{u_{i+1,j,k} - u_{i,j,k}}{\Delta x_{i,j,k}}$$

$$\varepsilon_{y_{x+}} = \frac{v_{i,j+1,k} - v_{i,j,k}}{\Delta y_{i,j,k}}$$

$$\varepsilon_{z_{x+}} = \frac{w_{i,j,k+1} - w_{i,j,k}}{\Delta z_{i,j,k}}$$

Another consequence of the staggered gridding is that the force balance equations (1) give rise to a thirteen-handed Jacobian for three-dimensional calculations. In addition to the standard diagonal and six off-diagonal bands, there are six more connecting points in the differencing stencil which contribute the other bands.

Fluid Component Conservation, Rock Mass Conservation and Volume Balance Equations Compositional and thermal simulation require the user to specify tire number of fluid components. Fluid components are conserved in the standard user-specified grid blocks as noted above. Rock also flows either elastically or plastically, in addition to fluid, amongst these grid cells. A rock mass conservation equation can be written in pseudo-differenced form as:

$$V \cdot \rho_{rock} \cdot [(1-\varphi)^{n+1} - (1-\phi)^n] = \sum_{faces} A_{face} \cdot (u, v, w_{face}^{n+1} - u, v, w_{face}^n) \cdot (\rho_{rock} \cdot (1-\varphi)^{n+1})^{up} \quad (5)$$

where
   V=bulk volume of the rock mass conservation cell
   $\rho_{rock}$=specific density of rock
   φ=porosity of rock (variable)
   u,v,w=x,y,z total rock displacement Superscripts n+1, n refer to the time level –n refers to the last time step, n+1 refers to the current or latest time level. The superscript "up" refers to the upstream of the rock displacement change over the time step. Flow of rock into an adjoining cell originates from the cell away from which rock flows during the timestep, as denoted by $u,v,w_{face}^{n+1} - u,v,w_{face}^n$ in the above equation (5). Total rock displacement is the sum of elastic and plastic rock displacement. The elastic rock displacements in the coordinate directions and porosity are included in the simulator variable set. Rock properties, for example relative permeability endpoints, are converted. Fluid component mass conservation assumes the usual form and is discussed elsewhere[19,20].

In order that the fluid volumes fit into the available pore volume, a final fluid phase volume balance equation is included. It is often written as the sum of fluid phase saturations (volume of fluid divided by pore volume) equal to unity.

Additional Enhancements to the Balance Equations

A term that describes the change of rock momentum in time, namely $$m_{rock} \frac{\partial^2 u}{\partial t^2},$$

where $m_{rock}$ the mass of rock in the rock balance grid cell, can also optionally be switched on by the user. By default it is omitted because this term is small and makes little contribution to the force balance. Also, when it is not specified, wave solutions of the form f(x±ct) are not calculated where c is some characteristic rock compression/shear velocity. These wavelets may cause instability and usually are of little interest over standard simulation time scales.

Secondly, as discussed by Corapcioglu and Bear[5], in a deforming porous medium it is the specific discharge relative to the moving solid, $q_r$, that is expressed by Darcy's law $$q_r = q - \phi V_x = -K \cdot \nabla H \quad (6)$$

where
   q=specific discharge of a fluid component (flux)
   φ=porosity
   $V_s$=velocity of the solid
   K=fluid phase permeability
   H=pressure head, including the gravitational head This term is, again, omitted by default but can be included if desired. In problems where the elastic and plastic rock flow is small and near steady state, there is not much contribution from this term. In situations where the pressure field is changing continuously and strongly, for example in a thermal cyclic huff and puff scenario where the near wellbore pressure can vary by more than 500 psi through a short, cycle time period, this term can have a strong effect on the simulation. In particular, it can reduce the unphysically high injection pressures normally predicted by a conventional simulator. There is an additional CPU expense associated with this term since it can add one or more newton iterations to a timestep.

Interaction between the Fluid and the Rock

The interactive force between the fluid and solid, denoted P in equation (1), can be expressed in the form[5]

$$\vec{P} = \vec{F}_f^{in} + \phi \vec{F}_f + \nabla \cdot \vec{\vec{T}}_f. \quad (7)$$

where
   $\vec{F}_f^{in}$=inertial force of the fluid per unit bulk volume
   $\vec{F}_f$=body force acting on the fluid per unit fluid volume
   $\vec{\vec{T}}_f$=stress tensor of the fluid The stress tensor of the fluid can be related to the pore fluid pressure, following Terzaghi's[21] concept of intergranular stress, $$\vec{\vec{T}}_f = -p \cdot \vec{\vec{I}}. \quad (8)$$

where $$\vec{\vec{I}}$$

is the unit tensor. We neglect the effect of the inertial forces of the fluid and write the interaction force as $$\vec{P} = -\nabla p + \phi \vec{F}_f \quad (9)$$

The pore pressures are calculated at the centers of the mass conservation cells so that the pore pressure gradient in equation (9), ∇p, is centered in the rock momentum conservation control volume as it should be.

Interaction of the rock stress on flow parameters, in particular fluid permeability, is a subject that is the topic of much current research. As noted above in the introduction, many authors are now carrying out triaxial compression tests on core and rock samples in which fluid is flowing in the stressed rock matrix. Most commercial reservoir simulators contain permeability or transmissibility modifiers as a function of fluid pore pressure. This feature was used in a geomechanics simulation study by Davies and Davies[22] where the relationship between stress and permeability was calculated based on the relationship between the stress and porosity, and between permeability and porosity for various rock types. Yale and Crawford[23] discuss the work of Holt[12], Teufel and Rhett[13,15,16] and others. They also used critical state theory to model observed stress-permeability experimental data. It was concluded that this theory did well represent the observed data.

We are currently exploring several constitutive relationships between stress and permeability. A mean effective stress versus permeability is one of these relationships, another is the classical permeability-porosity. Another possibility is permeability versus $\sigma_1-\sigma_3$, the difference between the maximum and minimum principal stresses, as displayed on the web by GFZ-Potsdam[24]. The success of the critical state theory as discussed in the above paragraph is also of interest.

Variables and Solution of the Equations

We solve for moles of all fluid components per unit pore volume, energy per unit bulk volume if thermal simulation is specified, pressure of one of the fluid phases, elastic rock displacements in the x,y,z directions and porosity. Some of these variables are eliminated before entering the solver. In particular, one of the fluid molar densities is eliminated using the volume balance equation. Usually, a fully implicit solution of all equations is unnecessary because in many parts of the grid the fluid throughput in a mass conservation grid cell is not high. In this case an adaptive implicit solution of the equation set is used in which some of the grid blocks are solved fully implicitly, while others are solved using the IMPES (implicit pressure, explicit saturation) solution scheme. Often the IMPES scheme is used everywhere although the timestepping of this particular scheme is then limited by the throughput. The rock force balance equations are always solved fully implicitly, even in grid cells that are IMPES.

The linear solver used to solve the coupled system of non-linear equations is a nested factorization technique[25]. One such linear solver is disclosed in U.S. Pat. No. 6,230,101 to Wallis, the disclosure of which is incorporated by reference into this specification. Although the rock stress equations (1) are nonlinear because of the implicit porosity and highly elliptic and, in addition, are placed next to mass conservation equations which display both hyperbolic and parabolic form in the Jacobian, the solver has demonstrated good robustness in solving the coupled system of equations.

Although some authors[8,26] have described fully or partially coupled schemes where porosity is calculated directly using rock dilation, $\epsilon_x+\epsilon_y+\epsilon_z$, we have chosen the additional rock conservation equation for two reasons. Firstly, the approach is more general and allows rock to be produced in cases of sand fluidization, wellbore instability, etc. Secondly, as discussed further below, at the beginning of a new timestep a large plastic displacement of the rock is accounted for exactly by including it in the implicit rock mass balance for this timestep.

Plasticity

An explicit plastic calculation has been implemented. The Mohr-Coulomb plastic calculation is available. The user can specify the cohesion and angle of internal friction in chosen regions in the grid. At the start of a new timestep, principal stresses are calculated in each rock force-balance control volume based on the stress field from the last timestep. Diameters of the smallest and largest Mohr circles are calculated and the test is made as to whether failure has occurred. If so, the displacement around which the control volume is centered is altered to bring the circle back to the failure envelope. This corrective displacement is stored as a plastic displacement. These plastic displacements, which can be referred to as $(u_p, v_p, w_p)$, are part of the total displacements $(u, v, w)$ which in turn are a sum of the elastic and plastic contributions.

Boundary Conditions and Initialization

Either stress or displacement boundary conditions can be chosen. Each side of the simulation grid, that is x−, x+, y−, y+ and z−, z+, can have one of the above boundary conditions prescribed. Usually the bottom of the grid will have a zero displacement condition while the sides and top will have specified stresses.

Initialization of a reservoir with stress boundary conditions requires an initial small simulation to equilibrate the simulated field. Before the wells are turned on, boundary stresses are ramped up at intervals until the desired vertical and horizontal stresses are achieved. The pore pressure is maintained at an initial level by including an extra production well with a BHP limit set to this level. Compression of the reservoir by the boundary stresses causes the rock matrix to compress which in turn forces some of the fluid out of this well. Fluid-in-place must be checked before starting the simulation.

User Interface

The user enters a Young's modulus, Poisson ratio and specific rock density for each grid block. It is also possible to input the full stiffness matrix, as illustrated above in equation (4), to allow an anisotropic stress tensor. If a plastic calculation is required, the user enters a cohesion and angle of internal friction in different regions of the grid.

Efficiency of Geomechanical Computations

Because there are several extra equations to be set up and solved, there is a sizable overhead associated with tire geomechanics calculation. This overhead is offset by several factors. Firstly, the coupled set of equations is stable and robust. Secondly, implementation of the Jacobian and right-hand-side setup includes vectorization wherever possible. Also, parallel options exist within the simulator.

On average, for three-dimensional IMPES simulations we have noted that run times are about three times as long as the run time needed for the same calculation without geomechanics. This is efficient considering the IMPES calculation only solves a single equation, whereas four additional equations are solved when geomechanics is included. Both the efficiency of setting up the equations and the robustness of the solver contribute to the overall efficiency. The simulator is capable of achieving good parallel speedups and this also helps to offset the increased computational demands.

Benchmarking Against an Industry Standard Stress Code

We have chosen the ABAQUS[27] stress simulator to test the rock stress calculations in our reservoir simulator. ABAQUS was chosen for two reasons. Firstly, it is widely accepted and established. Secondly, it contains a simple, single-phase flow-in-porous-media option.

Two elastic, one-dimensional problems were designed and run in both simulators. The test cases differed only in that one featured an average sandstone, the other a weak sandstone. They were designed to have large pore pressure gradients so that the fluid-rock rock interaction was pronounced.

Figures 4D, 5:
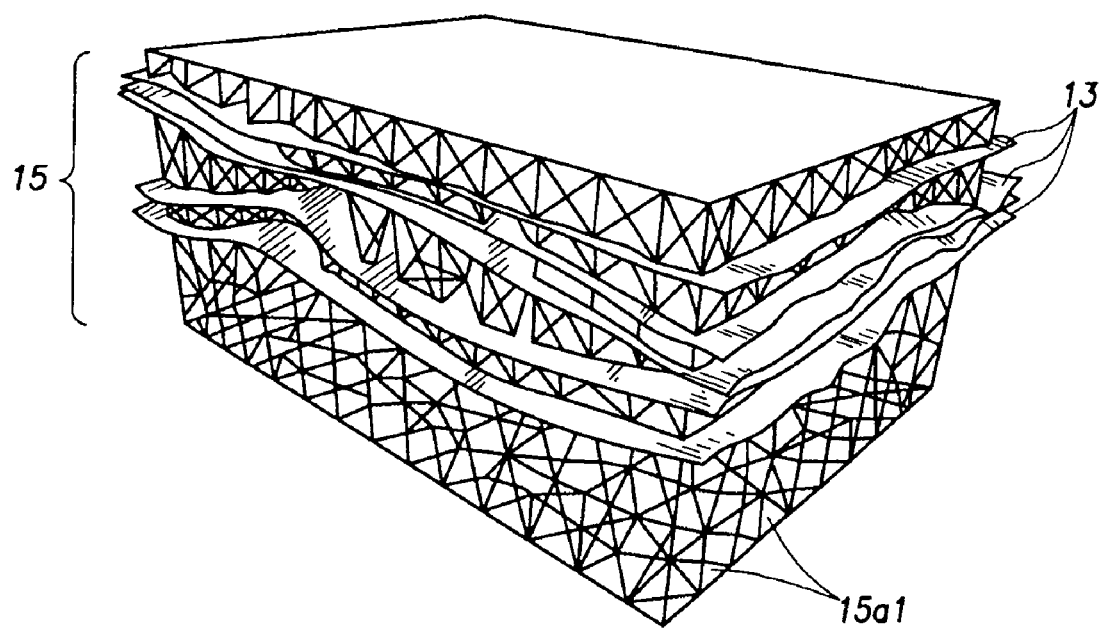
FIGS. 5-9 illustrate examples of structured and unstructured grids.

In FIG. 4d, Table 1 presents the simulation parameters used in the test problems. These are listed in the table as Cases 1 and 2. A water injection rate of 1000 BBL/D was used. The injector was situated in one corner, the producer in the far corner. Boundaries were rigid. Dimensions of the grid were chosen as representative of a small pattern of injectors and producers. The reservoir simulator was run to steady state for these cases. In FIG. 4d, under Table 1, in all cases, porosity=0.33, fluid permeability=6 mD, initial pressure=4790 psia, injection/production rate=1000 BBL/D and grid dimensions were 1000 ft×1000 ft×20 f.

Figure 2:
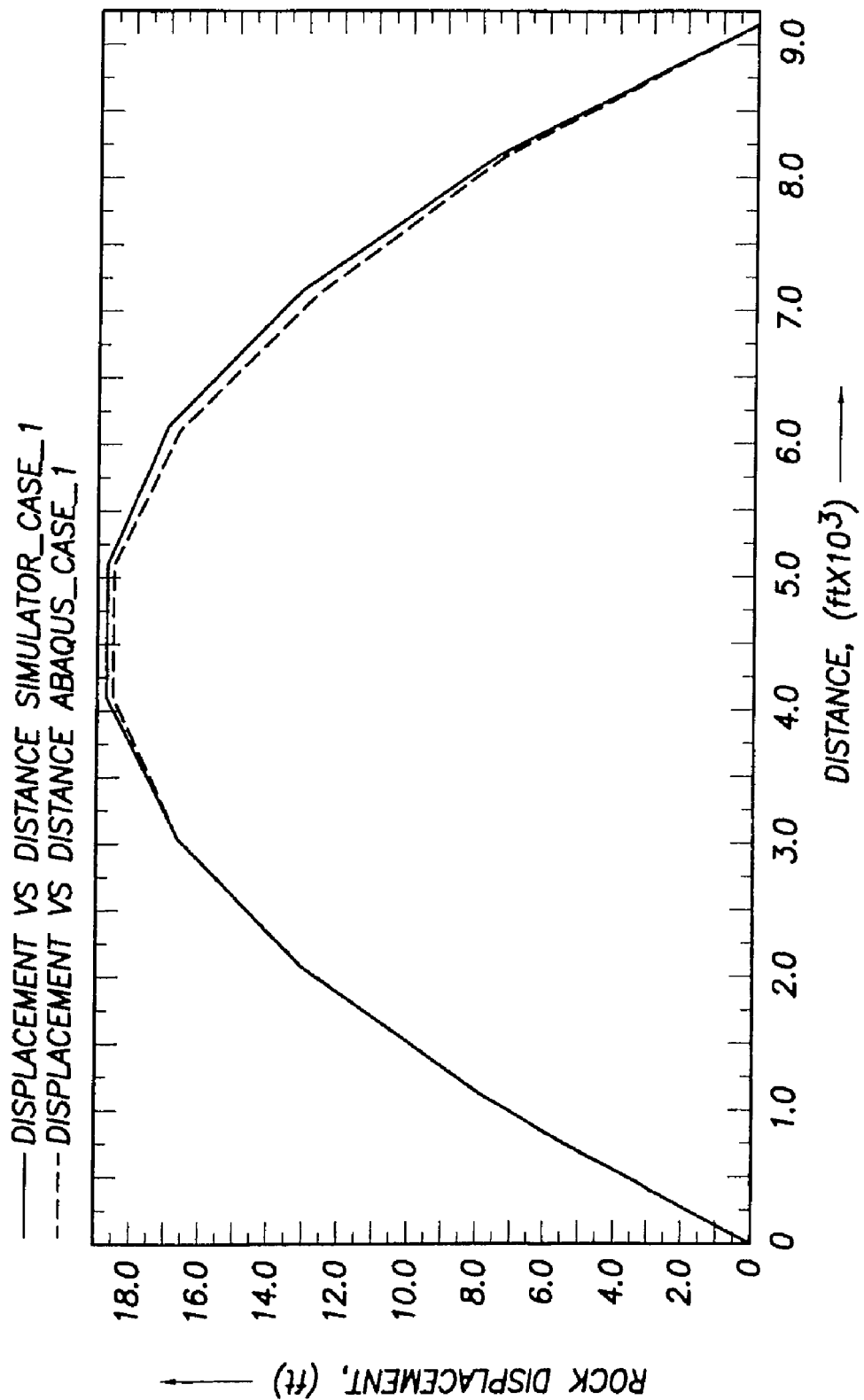
FIG. 2 illustrates comparison of Rock Displacement Predictions (case 1)

FIG. 2 shows a comparison of rock displacements as predicted by the two simulators for Case 1, the average strength sandstone.

Figure 3A:
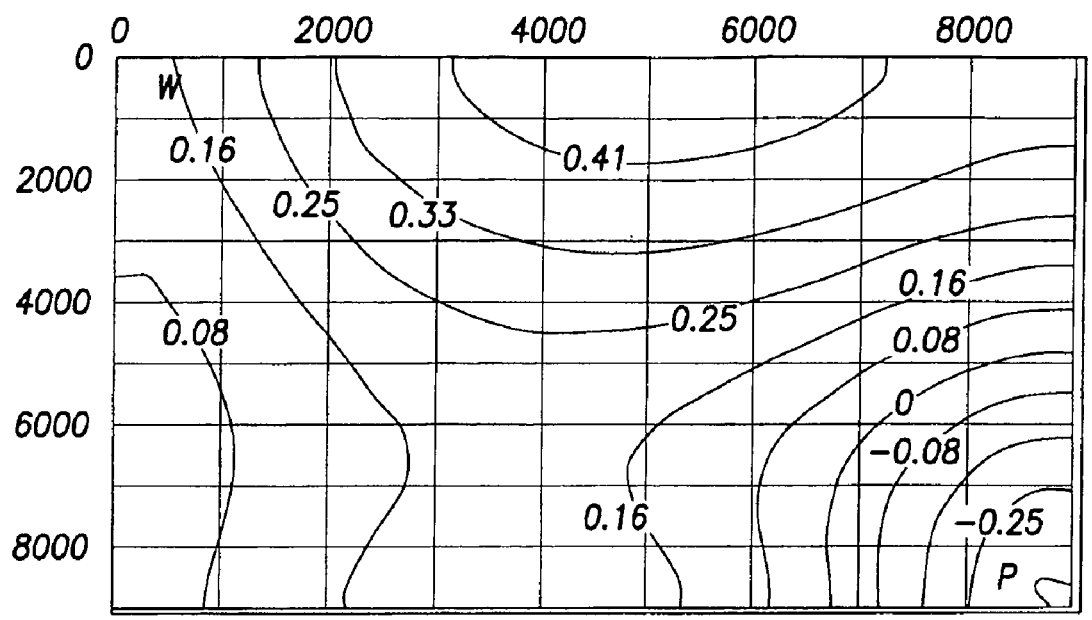
FIGS. 3A and 3B illustrate comparison of Rock Displacement Predictions (case 2)
Figure 3B:
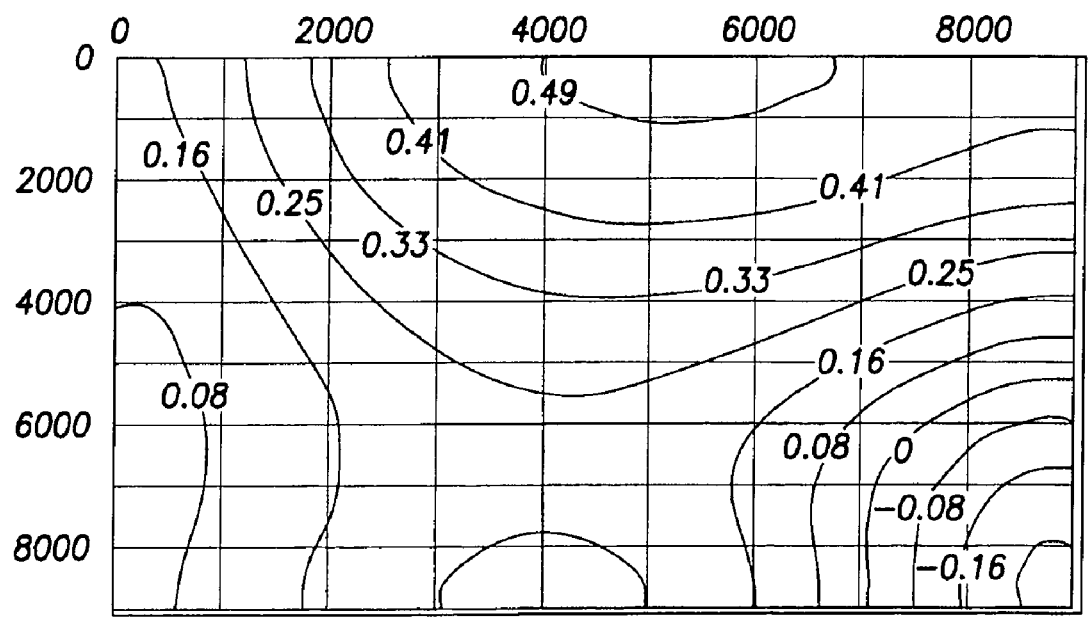

In FIGS. 3A and 3B, these figures illustrate a comparison for the weak rock. Much larger rock displacements are evident as a result of the very low Young's modulus. In both cases, the comparison against ABAQUS was within engineering accuracy.

Other Test Cases

In FIG. 4d, Table 1 is illustrated (Table 1 illustrating simulation parameters used in comparing ABAQUS and Reservoir Simulator Predictions). We have also run ABAQUS on a further set of four problems. Table 1, shown in FIG. 4d, lists these four problems as Cases 3 to 6, including a pair of two-dimensional and a pair of three-dimensional runs. For equilibration purposes, the ABAQUS simulations used boundary conditions that are not available in our reservoir simulator. We are currently working to remedy this. Initial comparisons in which we have approximated the ABAQUS simulation have been encouraging. Both quantitative and qualitative agreement has been achieved.

A plastic case was run in ABAQUS to compare against the reservoir simulator plastic calculation. It is the same as Case 6 in Table 1 of FIG. 4d. A cohesion and angle of internal friction was input to define the Mohr-Coulomb failure curve. Differences in boundary conditions in the two simulators, as discussed above, have prohibited a direct comparison but, again, there is qualitative agreement when comparing plastic displacements. The plastic calculation is robust and timestepping is not adversely affected.

In FIGS. 4a1 and 4a2, 4b1 and 4b2, and 4c1 and 4c2, we have simulated some larger fields with the geomechanics option. An example is shown in FIGS. 4a1 and 4a2. In this three-dimensional, compositional (10 component) problem, 7 injection and 6 production wells contribute to the rock stress. Contours of the total normal stress, $\sigma_x+\sigma_y+\sigma_z$ which is also the first stress invariant, are shown in the mid-xy plane of the simulation. This first stress invariant is important because it largely governs compaction processes. Timestepping with the geomechanics calculation included was the same as without. There was a factor of 2.8 slowdown in the overall runtime with geomechanics.

In summary, the implementation of elastic/plastic stress equations into a commercial, finite difference reservoir simulator has been discussed in this specification. Our goal of demonstrating robustness together with a comprehensive geomechanical option has been achieved. Work is continuing to develop this option further. In particular:

1. The coupled system of equations has demonstrated good stability and robustness. In some test cases, there was no difference in timestepping when the simulation was run with or without the geomechanics option.

2. Our current capabilities are comprehensive enough to predict both elastic and plastic rock displacement. The basic design is general enough to allow future engineering development. This could include wellbore stability and failure, sand production, more accurate fault modeling.

3. We have indicated at various points of this paper our areas of current work and investigation. In particular these include stress-permeability relationships and modifying our geomechanical boundary conditions to compare more exactly with ABAQUS. We arc also currently working with a large-scale simulation of a very brittle carbonate field to predict subsidence.

Nomenclature

Figure 6:
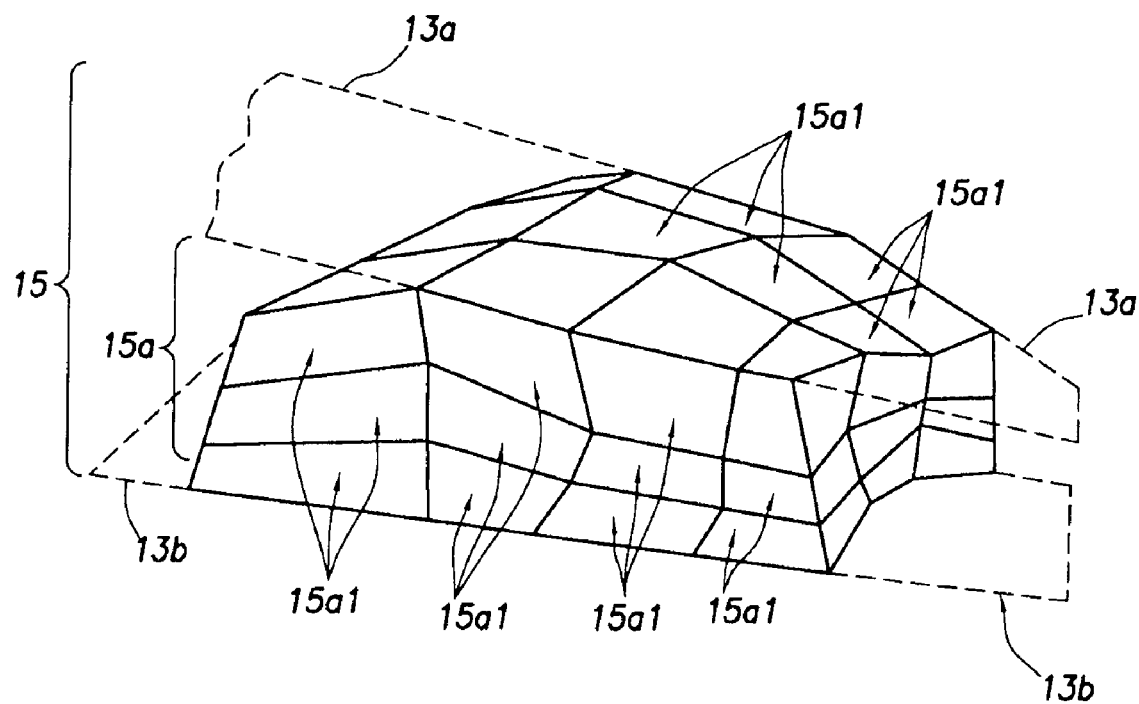

E=Young's modulus
G=modulus of rigidity, Lamé constant
H=pressure head, including the gravitational head
K=fluid phase permeability of rock matrix
q=single phase fluid flux in a porous medium
u=rock displacement in the x-direction
v=rock displacement in the y-direction
$V_s$=velocity of the solid, as related to Darcy's law
w=rock displacement in the z-direction
$\sigma_{x,y,z}$=elastic normal rock stress in x,y,z directions
$\epsilon_{x,y,z}$=elongation strains
$\gamma_{xy,yz,zx}$=shear strains
$\lambda$=Lamé constant
$\phi$=porosity
$\nu$=Poisson's ratio
$\rho_{rock}$=rock specific density
$\tau_{xy,yz,xz}$=elastic shear stress Referring to FIGS. 5 and 6, structured and unstructured grids are illustrated. In FIG. 5, an earth formation 15 is illustrated, the formation 15 including four (4) horizons 13 which traverse the longitudinal extent of the formation 15 in FIG. 5. Recall that a "horizon" 13 is defined to be the top surface of an earth formation layer, the earth formation layer comprising, for example, sand or shale or limestone, etc.

A "grid" is located intermediate to the horizon layers 13. More particularly, a "grid" is formed: (1) in between the horizons 13, (2) on top of the uppermost horizon 13, and (3) below the lowermost horizon 13 in the Earth formation 15. When gridding the formation 15, the act or function of "gridding" the formation 15 includes the step of dividing the formation 15 into a multitude of individual "cells" which, when connected together, comprise the "grid".

In FIG. 6, for example, the Earth formation 15 includes an uppermost horizon 13a and a lowermost horizon 13b which is separated from the uppermost horizon 13a by an intermediate earth formation layer 15a. The intermediate earth formation layer 15a includes, for example, a sand layer or a shale layer or a limestone layer, etc. A particular "gridding software" will "grid" the earth formation layer 15a; that is, the formation layer 15a will be divided up, by the "gridding software" into a multitude of cells 15a1.

In the prior art, a "gridding software" product known as GRID was marketed by GeoQuest, a division of Schlumberger Technology Corporation, Abingdon, the United Kingdom (U.K.). The GRID software divides tire formation layers 15a into a multitude of cells. However, each of the multitude of cells were approximately "rectangular" in cross sectional shape.

In addition, another "gridding software," known as PETRAGRID, is disclosed in U.S. Pat. No. 6,018,497, the disclosure of which, is incorporated by reference into this specification. The PETRAGRID gridding software 'grids' the formation with triangularly/tetrahedrally shaped grid cells, known as "unstructured grid cells."

In addition, another "gridding software", known as FLO-GRID®, is disclosed in U.S. Pat. No. 6,106,561, the disclosure of which is incorporated by reference into this specification. The FLOGRID® gridding software includes the PETRAGRID gridding software; however, in addition, the FLOGRID® gridding software 'grids' the formation with rectangularly shaped grid cells, known as "structured grid cells."

In FIG. 6, the cells 15a1 are shown to be approximately "rectangular" in cross sectional shape. These grid cells are "structured grid cells."

In FIG. 5, however, a multitude of grid cells 15a1 have been formed in the earth formation 15 intermediate the horizons 13, and each cell 15a1 has a cross sectional shape that, in addition to being approximately "rectangular" in cross section, is either approximately "polygonal" or "tetrahedral" in cross section. FIG. 5 clearly shows a multitude of cells 15a1 where each cell 15a1 has a cross sectional shape which is either approximately "polygonal" or "tetrahedral" in cross sectional shape (i.e., an "unstructured grid cell") in addition to being approximately "rectangular" in cross sectional shape (i.e., a "structured grid cell").

Figure 7:
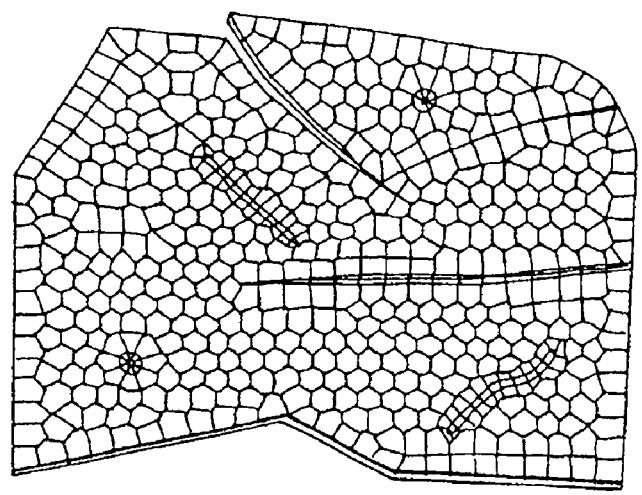
Figure 9:
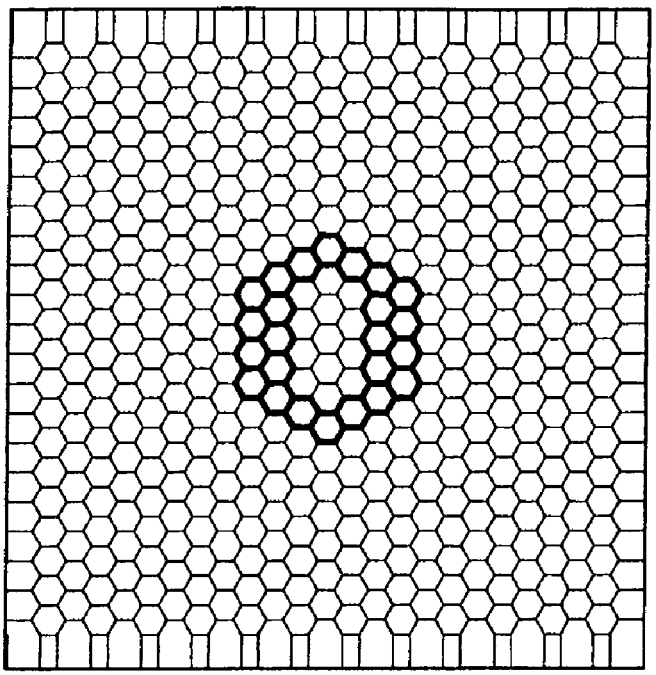
Figure 8:
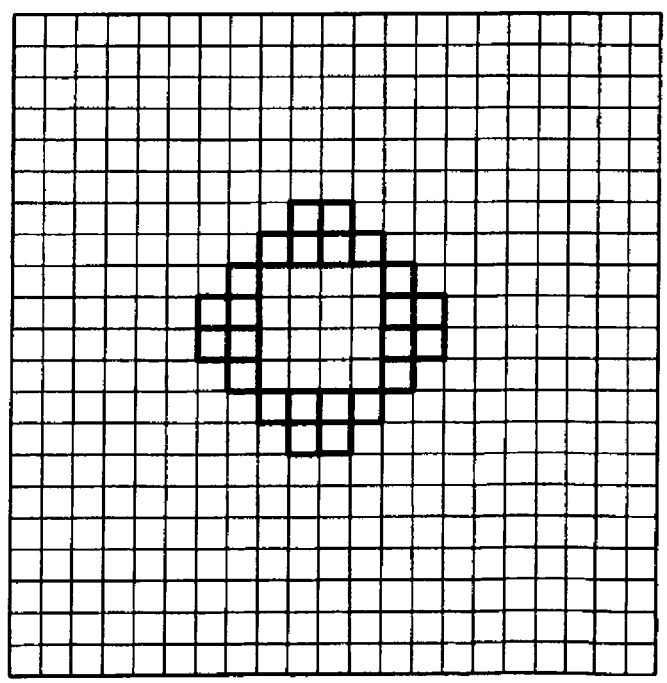

Referring to FIGS. 7, 8, and 9, other examples of "structured" and "unstructured" grid cells are illustrated. FIG. 7 illustrates examples of "un-structured" grid cells having a triangular/tetrahedral cross sectional shape. FIG. 8 illustrates examples of "structured" grid cells having an approximate "rectangular" cross sectional shape. FIG. 9 illustrates further examples of "unstructured" grid cells having a triangular/tetrahedral cross sectional shape.

Figure 10:
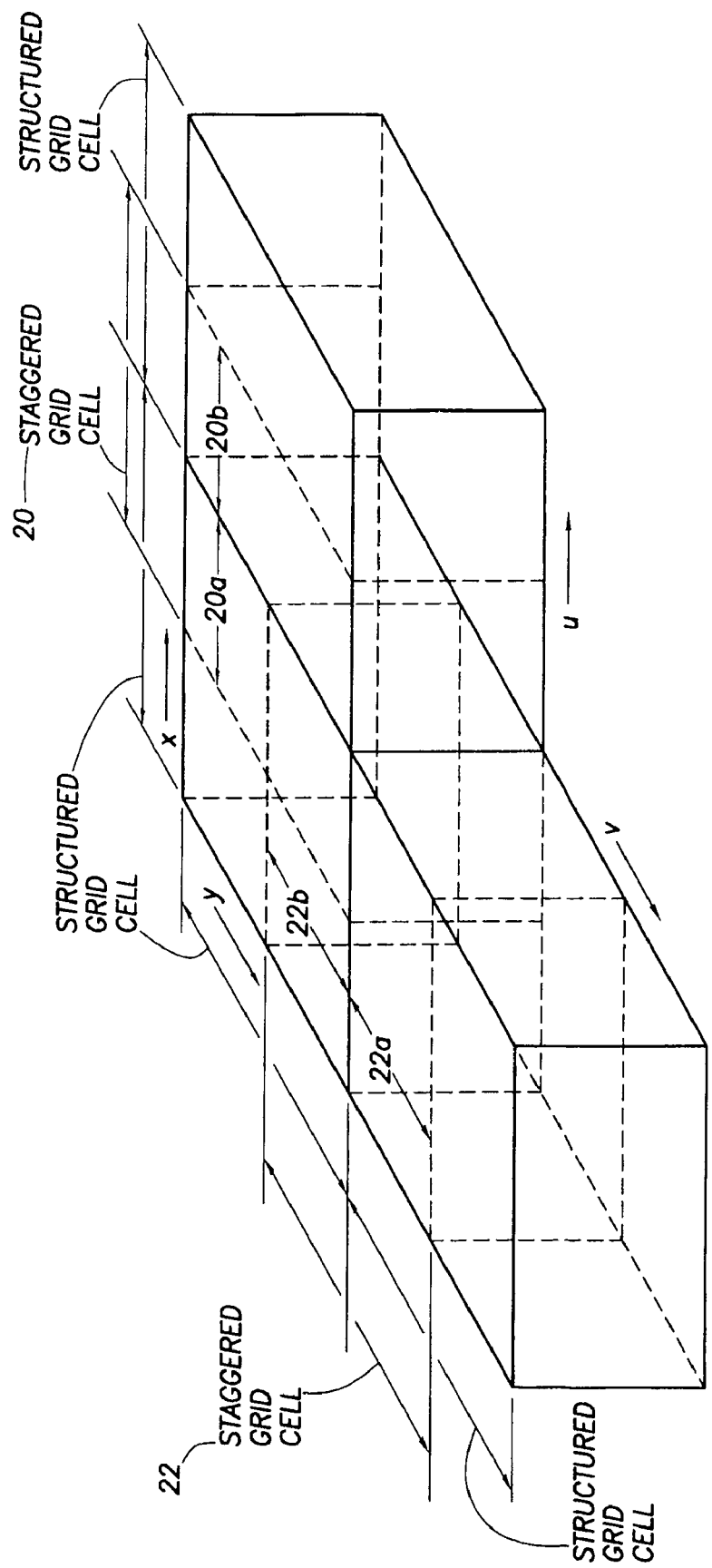
FIGS. 10 and 11$a$ illustrate examples of a staggered grid.
Figure 11A:
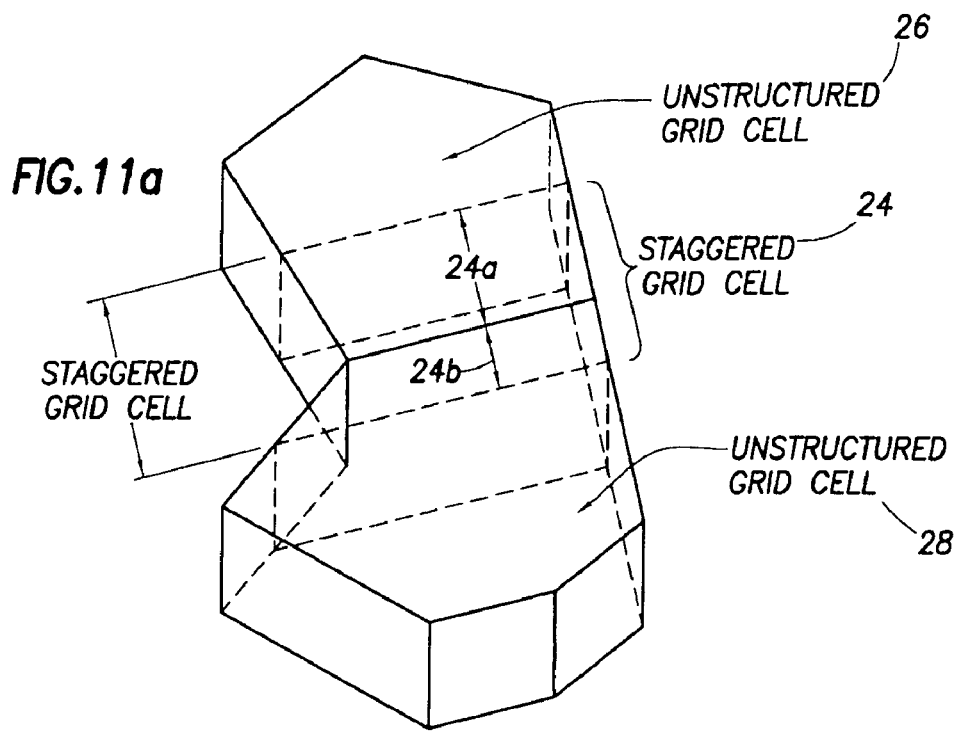

Referring to FIGS. 10 and 11a, a "staggered grid" will now be defined with reference to FIGS. 10 and 11a. In FIG. 10, a plurality of "structured" grid cells are illustrated (i.e., cells having an approximately rectangularly shaped cross sectional shape). However, in FIG. 10, a pair of "staggered grid cells" is also illustrated. Assuming that a 'first structured or unstructured grid cell' is disposed directly adjacent a 'second neighboring structured or unstructured grid cell', a "staggered grid cell" can be defined as one which consists of a 'first half' and a 'second half,' where the 'first half' of the 'staggered grid cell' comprises one-half of the 'first structured or unstructured grid cell' and the 'second half' of the 'staggered grid cell' comprises one-half of the 'second neighboring structured or unstructured grid cell.' For example, in FIG. 10, the staggered grid cell 20 includes the one-half 20a of a first structured grid cell and the one-half 20b of the neighboring, second structured grid cell. Similarly, the staggered grid cell 22 includes the one-half 22a of a first structured grid cell and the one-half 22b of a neighboring, second structured grid cell.

In FIG. 11a, a pair of 'unstructured' grid cells are illustrated (i.e., cells each having an approximately triangularly or tetrahedrally shaped cross sectional shape). In FIG. 11a, a staggered grid cell 24 consists of a first half 24a from one unstructured grid cell 26 and a second half 24b from a second unstructured grid cell 28.

Displacements normal to the fault plane are defined at die fault on each side of the fault. There is a discontinuity in the grid as shown in FIGS. 10, 11a, 11b, and 11c so that a separate set of grid interfaces exists on either side of the fault. Each grid on either side of the fault contains an implicit variable positioned in the centroid of the face of the cell that touches the fault. This displacement is the displacement of the fault in the normal direction at that point. Tangential displacements are defined at the midpoints of cell surfaces whose direction lies approximately tangential to the fault. These tangential displacements have a rock momentum balance equation associated with them that is one of the standard rock momentum staggered control volumes discussed above. The normal displacements ate unknowns that need constitutive relations to be fixed. These relations are supplied as follows.

Forces that are normal to the fault are balanced across the entire fault plane. A surface on the side "−" of the fault may have many intersecting surfaces on the "+" side. All normal stresses on the side are multiplied by the normal surface area on that side, and set equal to the sum of normal stresses on the "+" side multiplied by the normal areas of the cells in which those stresses are defined on that side. This operation constitutes the residual equation for the fault displacement. For a given fault in a direction iid, this force balance residual may be written $$R_{iid}^{fault} = \sum_{i+}\left(\left(\sum_{j=1}^{3} C_{iid,j}^{i+}\varepsilon_j^{i+}\right) - \alpha_{i+}P_{i+}\right)A_{i+iid}^{fault} - \tag{10}$$

-continued
$$\sum_{i-}\left(\left(\sum_{j=1}^{3} C_{iid,j}^{i-}\varepsilon_j^{i-}\right) - \alpha_{i-}P_{i-}\right)A_{i-,iid}^{fault}$$

where i− or i+ are cell indices on the and "−" and "+" sides of the fault, $C_{iid,j}^i$ is the stiffness matrix, $\varepsilon_j^i$ are strains, $\alpha_i$ is Blot's constant, $P_i$ is pore pressure and $A_{i,iid}^{fault}$ is the interface area in cell i, direction iid that touches the fault.

Residuals for all normal displacement variables on both sides of the fault force the displacement at that point to equal the fault displacement. A single cell, the top-most cell on a "−" side of the fault and a fault-normal control volume residual in that cell, are reserved to contain the relation governing the displacement of the fault. This relation is the fault-normal force balance residual as described above. A fault may only be continuous vertically up to a point where there is a common interface between two cells. Therefore, a fault may stop and start again, vertically. This completes the set of relations required. Dilation of the fault is not allowed. The fault therefore moves with a single normal velocity.

Shear stresses are handled as follows. A fault shear stiffness (see Priest, S. D., "Discontinuity Analysis for Rock Engineering," Chapman & Hall, London), $k_s$, is defined as a property of the fault. By default, it is set to $$\max\left[\left(\frac{\lambda + 2G}{\Delta z_{min}}\right)\right] \tag{11}$$

where λ and G are the Lamé constants and $\Delta z_{min}$ is the smallest halfwidth in the normal direction of any adjoining grid. The shear stress on the fault plane is then $$\tau_F = k_s \cdot \Delta s \tag{12}$$

where Δs is an increment in shear (tangential) displacement along the fault. A force balance over a tangentially directed control volume on either side of the fault will use the shear stress in equation (12) multiplied by the interface area at the fault on that surface of the control volume that touches the fault.

In addition, the user can define a simple Mohr Coulomb criterion to calculate a maximum shear stress, as follows:

$$\tau_{max} = c + \tan\theta \cdot \sigma \tag{13}$$

where c is the cohesion (stress) along the interface, and θ is the friction angle of the interface surface. This constraint of force along the fault plane allows tangential slippage to take place. FIG. 11d shows a depiction of the normal stress across a fault as calculated using this technique.

Figure 11E:
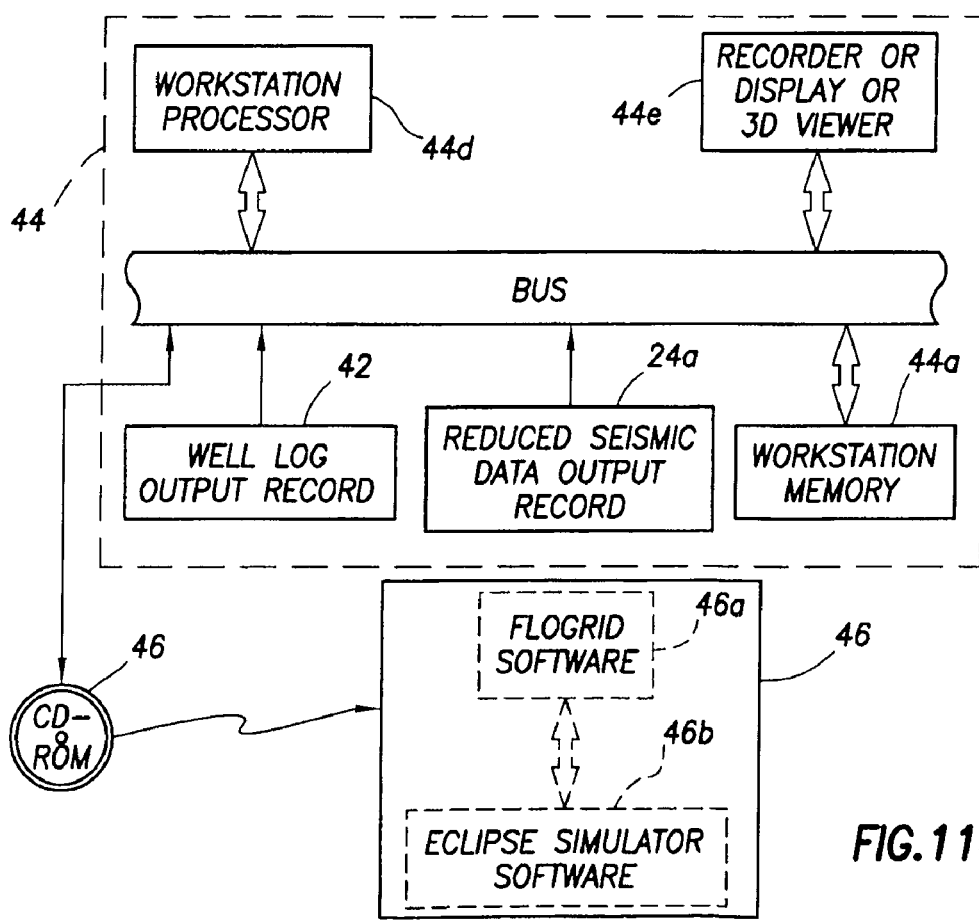
Figure 11B:
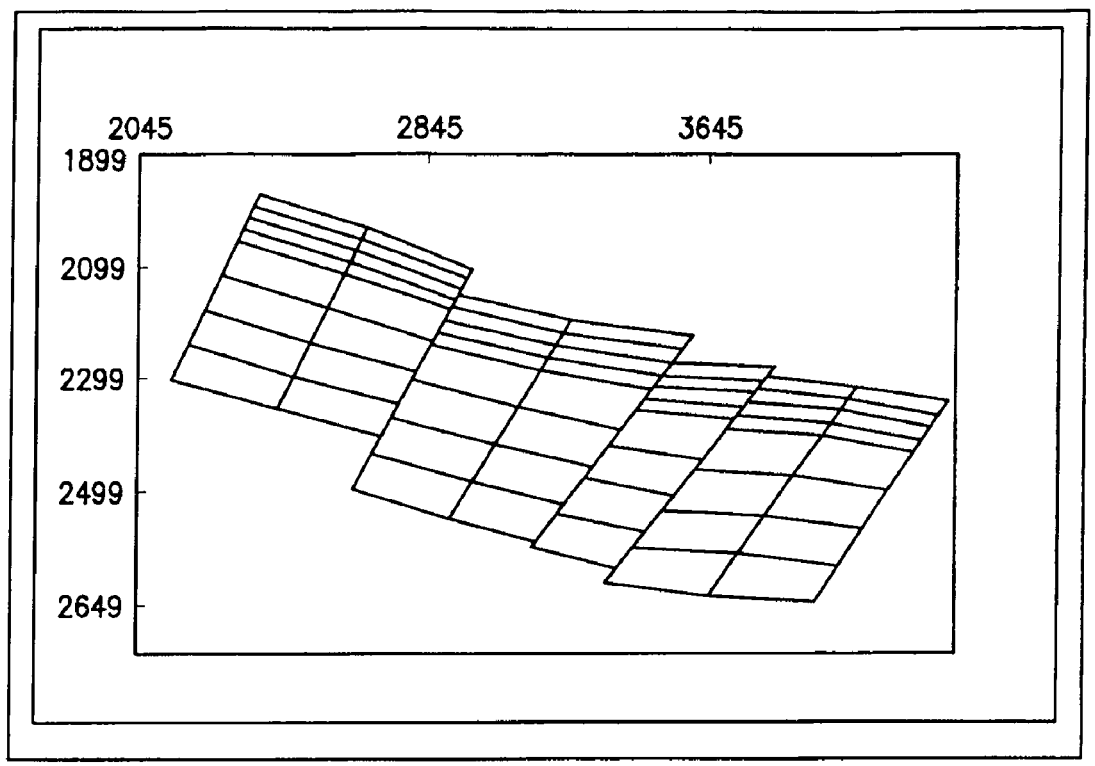
Figure 11C:
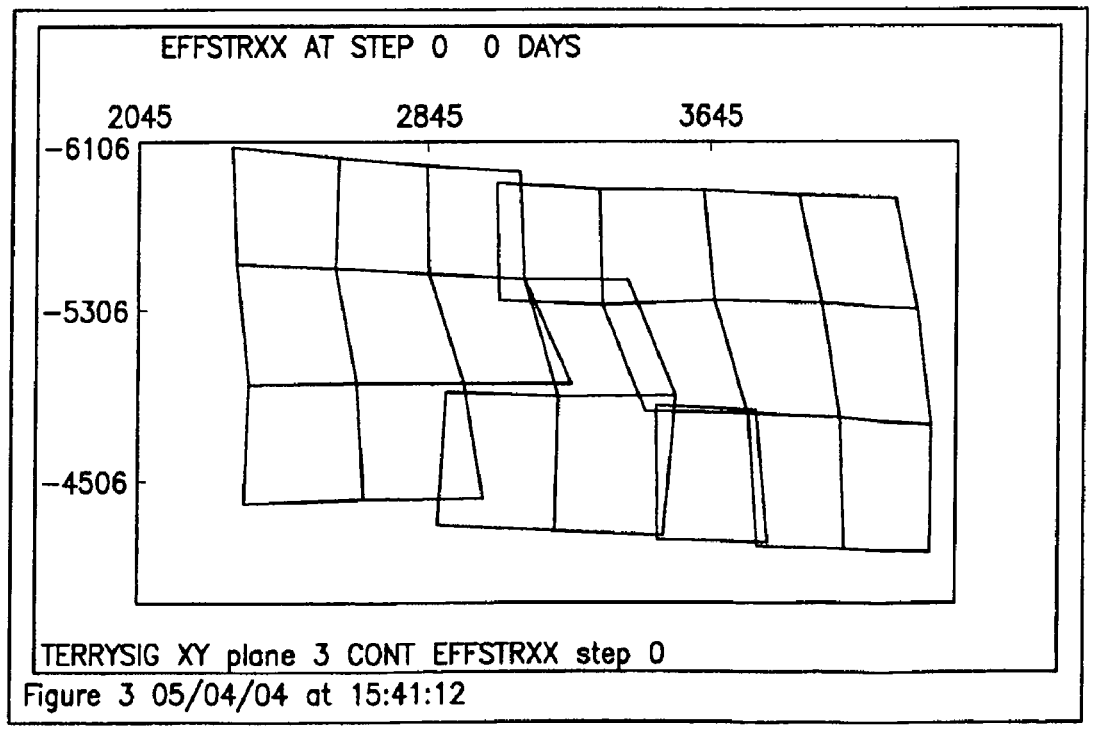
Figure 11D:
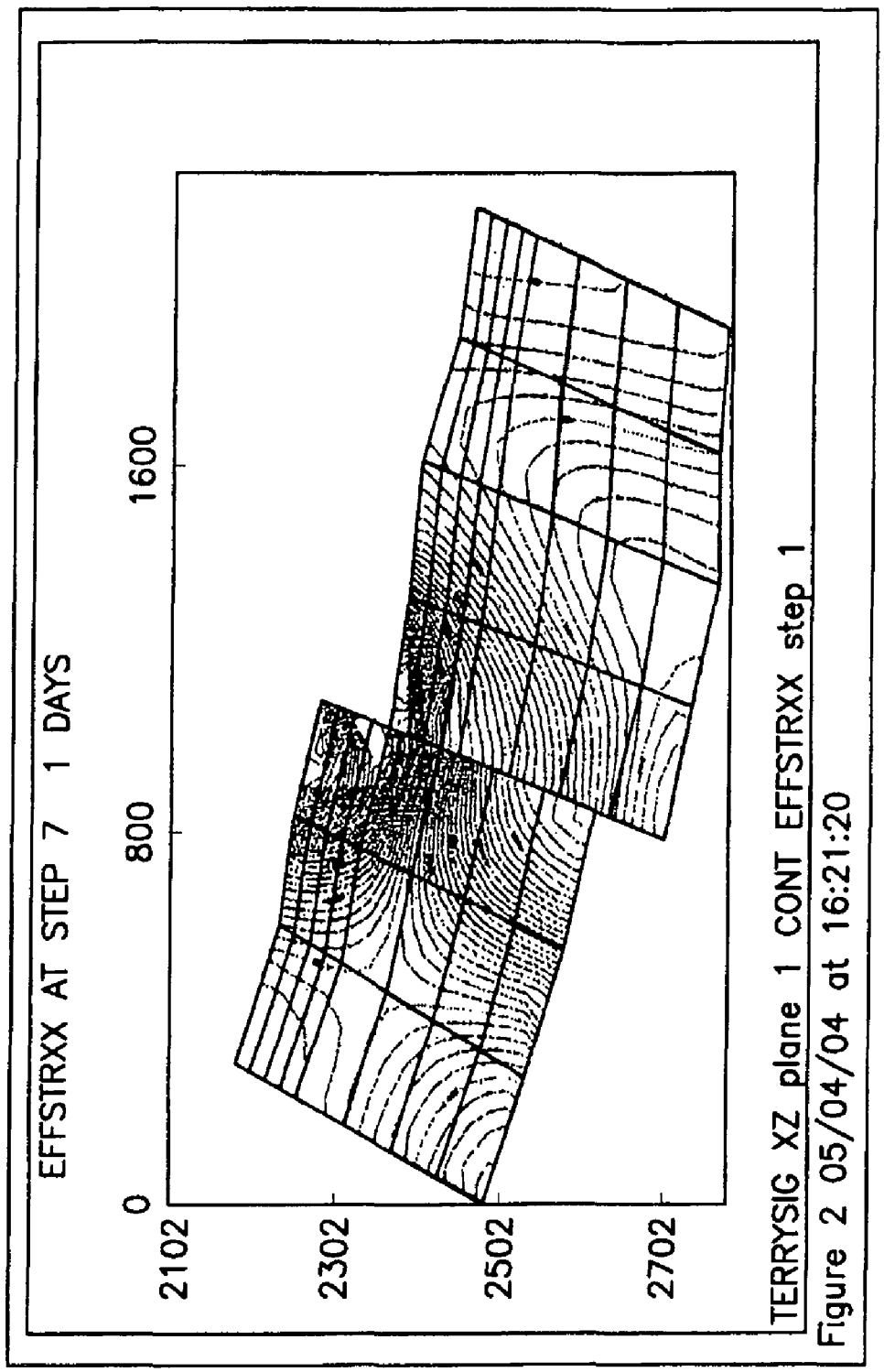

Referring to FIGS. 11e, 12, 13, and 14, a computer workstation 44 or other computer system 44 is illustrated. In FIG. 11e, the computer workstation 44 in FIG. 11e includes a system bus, a workstation processor 44d connected to the bus, a workstation memory 44a connected to the bus, and a recorder or display or 3D viewer 44e connected to the bus. A CD-Rom 46 is inserted into the workstation and the following software is loaded from the CD-Rom 46 and into the workstation memory 44a: (1) a FLOGRID® software 46a, and (2) an ECLIPSE® simulator software 46b. The FLOGRID® software is described in U.S. Pat. No. 6,106,561 to Farmer, the disclosure of which has already been incorporated by reference into this specification. Input data is provided to and input to the workstation 44: (1) a well log output record 42, and (2) a reduced seismic data output record 24a.

Figure 12:
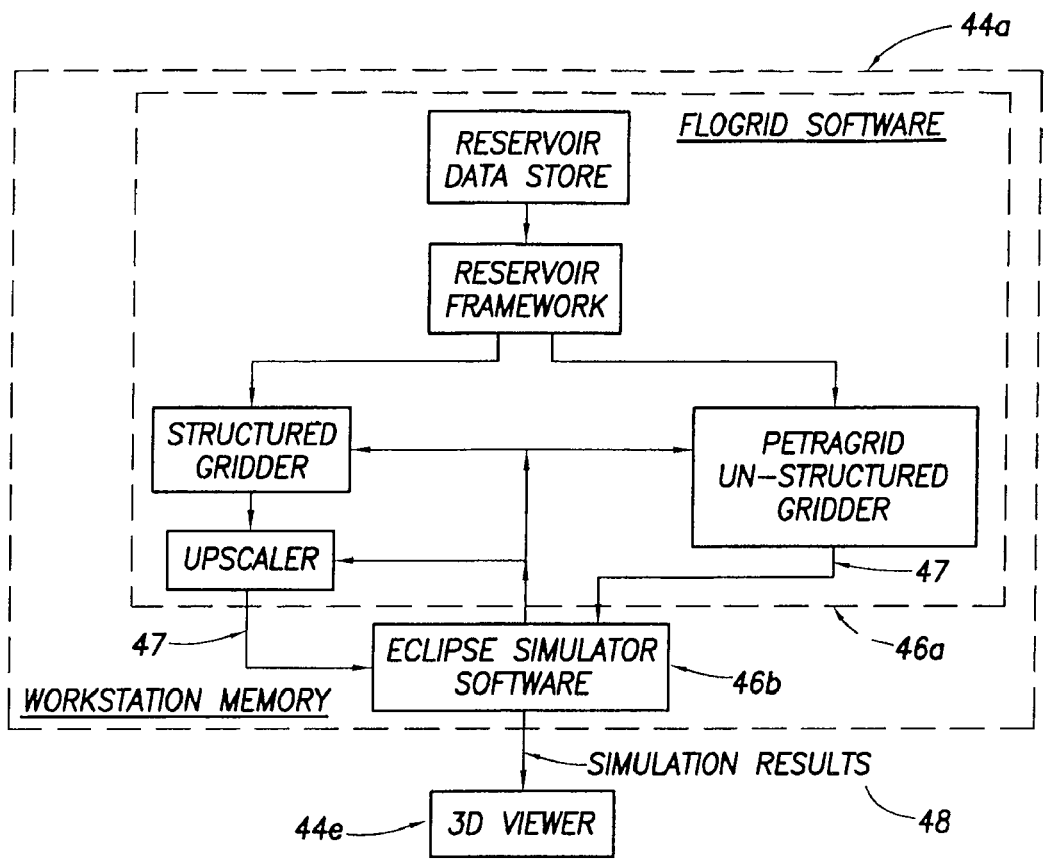

In FIG. 12, the workstation memory 44a of FIG. 11e stores the FLOGRID® software 46a and the ECLIPSE® simulator software 46b. The FLOGRID® software 46a includes a reservoir data store, a reservoir framework, a structured gridder, a PETRAGRID Un-structured gridder, and an Upscaler. The outputs 47 from the Upscaler and from the PETRAGRID Unstructured gridder are provided as Inputs to the Eclipse simulator software 46b. The PETRAGRID Un-structured gridder is disclosed in U.S. Pat. No. 6,018,497 to Gunasekera, the disclosure of which has already been incorporated by reference into this specification. The ECLIPSE® simulator software 46b, responsive to the outputs 47, generates a set of 'simulation results' 48 that are provided to the 3D viewer 44e. The ECLIPSE® simulator software 46b includes a "Linear Solver" which is discussed in U.S. Pat. No. 6,230,101 to Wallis, the disclosure of which is incorporated by reference into this specification.

Figure 13:
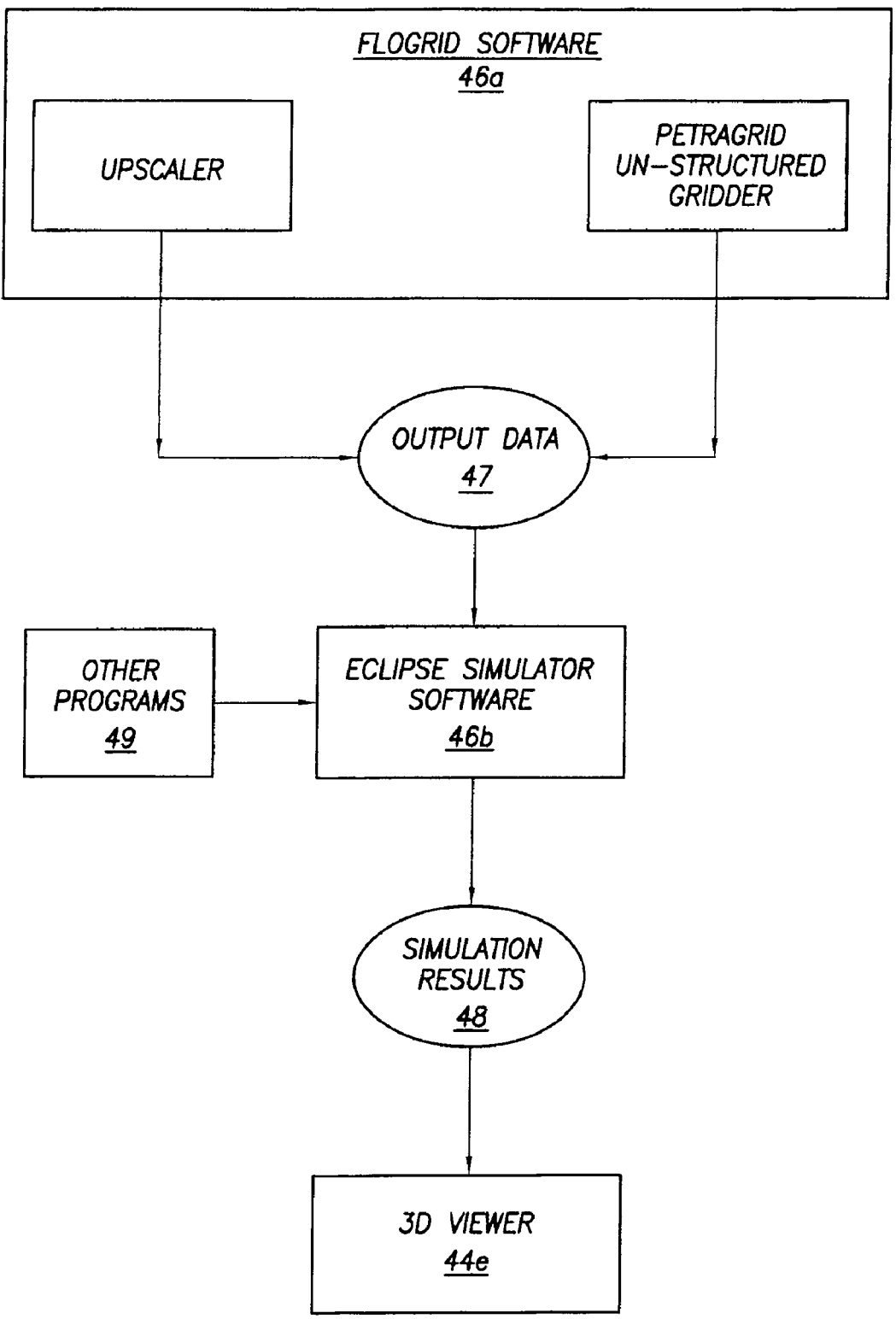

In FIG. 13, to summarize FIGS. 11e and 12, output data 47 is generated from the Upscaler and the PETRAGRID unstructured gridder in the FLOGRID® software 46a, and that output data 47 is provided to the ECLIPSE® simulator software 46b, along with the outputs of other programs 49. Responsive thereto, the ECLIPSE® simulator software 46b generates a set of simulation results 48 which are, in turn, provided to the 3D viewer 44e.

Figure 14:
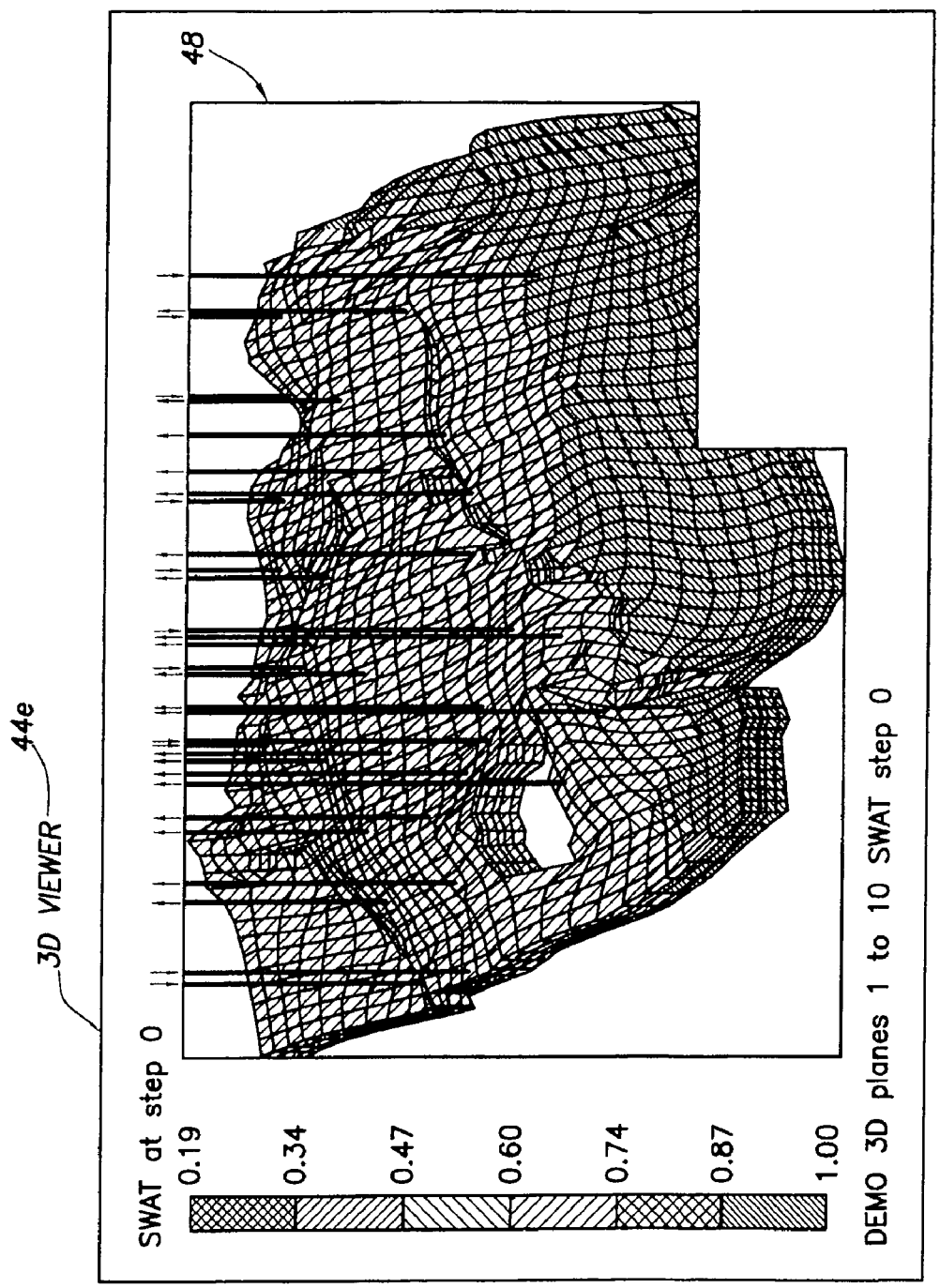
FIG. 14 illustrates an example of the 'simulation results'.

In FIG. 14, one example of the simulation results 48, which are displayed on the 3D viewer 44e of FIG. 13, is illustrated.

Figure 15:
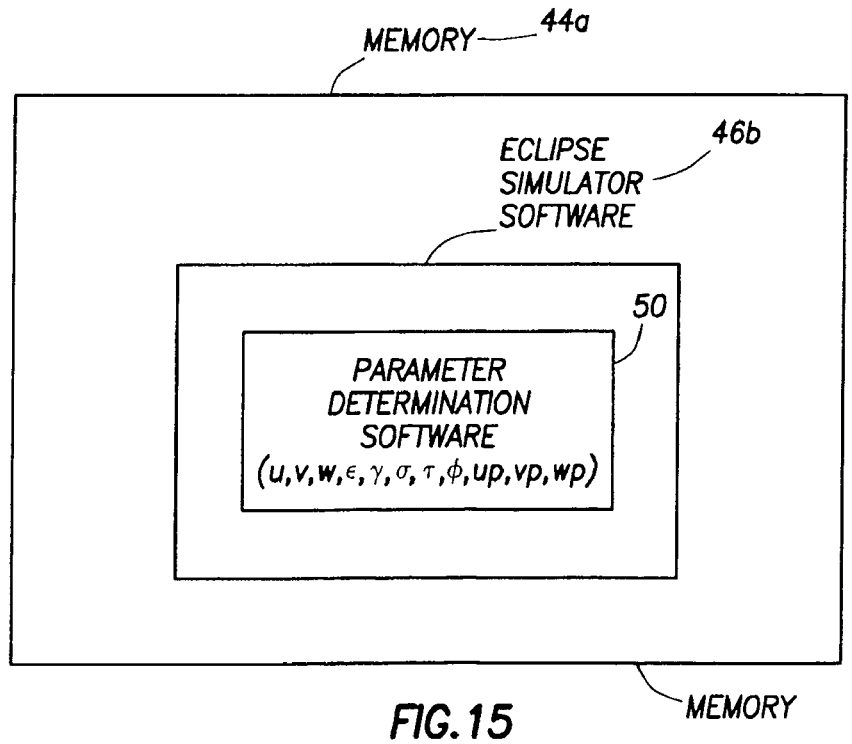
FIG. 15 illustrates the fact that the ECLIPSE® simulator software includes the 'Parameter Determination Software' of the present invention.

Referring to FIG. 15, as previously discussed, the workstation memory 44a stores the ECLIPSE® simulator software 46b. However, in accordance with one aspect of the present invention, the ECLIPSE® simulator software 46b includes a Parameter Determination software 50. The "parameters" are determined for each "staggered grid cell," such as each of the "staggered grid cells" shown in FIGS. 10 and 11a of the drawings. The "parameters," which are determined by the Parameter Determination software 50 for each 'staggered grid cell,' include the following "parameters," which have been previously discussed in the "Description of the Invention" portion of this specification:

u=rock displacement in the x-direction
v=rock displacement in the y-direction
w=rock displacement in the z-direction Therefore, the parameters (u, v, w) represent the movement of the rock. When the aforementioned parameters (u, v, w) have been determined, the following "additional parameters" are determined for each 'staggered grid cell' from and in response to the parameters (u, v, w), and these "additional parameters" have also been discussed in the "Description of the Invention" portion of this specification:

$\epsilon_{x,y,z}$=x,y,z elongation strains
$\gamma_{xy,yz,zx}$=shear strains
$\sigma_{x,y,z}$=elastic normal rock stress in x,y,z directions
$\tau_{xy,yz,xz}$=elastic shear stress
$\phi$=porosity of rock (variable)
$u_p$=plastic rock displacement in the x-direction
$v_p$=plastic rock displacement in the y-direction
$w_p$=plastic rock displacement in the z-direction Recall equation (3) set forth in the "Description of the Invention" portion of this specification, as follows:

$$\epsilon_x = \frac{\partial u}{\partial x} \quad (3)$$

-continued $$\epsilon_y = \frac{\partial v}{\partial y}$$

$$\epsilon_z = \frac{\partial w}{\partial z}$$

$$\gamma_{xy} = \frac{\partial u}{\partial y} + \frac{\partial v}{\partial x}$$

$$\gamma_{yz} = \frac{\partial v}{\partial z} + \frac{\partial w}{\partial y}$$

$$\gamma_{zz} = \frac{\partial w}{\partial x} + \frac{\partial u}{\partial z}.$$

We start by estimating values for (u, v, w), which is hereinafter referred to as the 'estimating procedure.' Therefore, when (u, v, w) is estimated by the Parameter Determination software 50 of the present invention, the values of "$\epsilon_{x,y,z}$" (the 'x,y,z elongation strains') and "$\gamma_{xy,yz,zx}$" (the 'sheer strains') are determined from me above equation (3). When "$\epsilon_{x,y,z}$" and "$\gamma_{xy,yz,zx}$" are determined from equation (3), the values of "$\sigma_{x,y,z}$" (the 'elastic normal rock stress in x,y,z directions') and "$\tau_{xy,yz,xz}$" (the 'elastic shear stress') are further determined from the above described equation (2), as follows:

$$\sigma_x = 2G\epsilon_x + \lambda(\epsilon_x + \epsilon_y + \epsilon_z)$$

$$\sigma_y = 2G\epsilon_y + \lambda(\epsilon_x + \epsilon_y + \epsilon_z)$$

$$\sigma_z = 2G\epsilon_z + \lambda(\epsilon_x + \epsilon_y + \epsilon_z)$$

$$\tau_{xy} = G\gamma_{xy}$$

$$\tau_{yz} = G\gamma_{yz}$$

$$\tau_{zx} = G\gamma_{zx} \quad (2)$$

Now that "$\sigma_{x,y,z}$" and "$\tau_{xy,yz,xz}$" are known, the previously described set of 'rock momentum balance' differential equations [that is, equation (1)] are solved using the aforementioned known values of "$\sigma_{x,y,z}$" and "$\tau_{xy,yz,xz}$". After the 'rock momentum balance' differential equations are solved, if the resultant 'residuals' are determined to be approximately equal to zero (0), the previously estimated values of (u, v, w) are thereby determined to represent 'accurate rock displacement parameters' for the reservoir. Subsidence is determined from the 'accurate rock displacement parameters' by solving a final set of failure criterion equations, which comprise the residuals and any derivatives, to determine a set of rock plastic displacements ($u_p$=plastic rock displacement in the x-direction, $v_p$=plastic rock displacement in the y-direction, and $w_p$=plastic rock displacement in the z-direction) forming apart of the rock displacement parameters (u, v, w).

The Parameter Determination software 50 also determines "$\phi$", the porosity of rock, which is a variable set forth in equation (5) set forth above.

Figure 16:
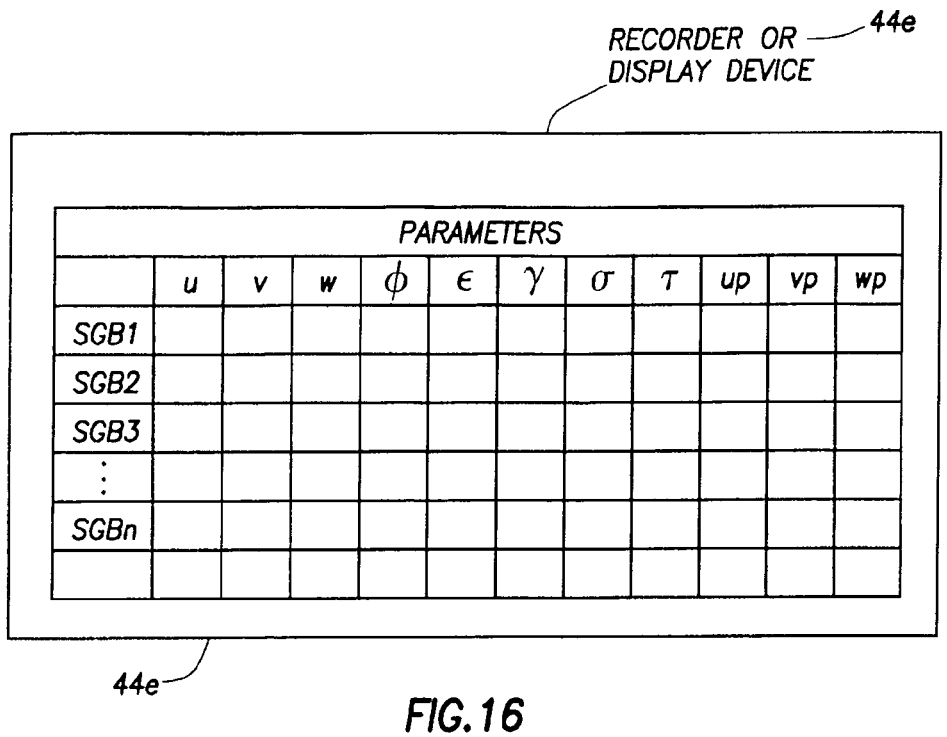
FIG. 16 illustrates the results which are generated when the 'Parameter Determination Software' is executed by a processor of a workstation, the results being presented and displayed on a recorder or display device.

Referring to FIG. 16, when the parameters (u, v, w, $\epsilon_{x,y,z}$, $\gamma_{xy,yz,zx}$, $\sigma_{x,y,z}$, $\tau_{xy,yz,xz}$, $\phi$, $u_p$, $v_p$, $w_p$) have been determined as discussed above, for each staggered grid block or cell, the Recorder or Display or 3D Viewer 44e of FIG. 11e illustrates a "Table" similar to the "Table" shown in FIG. 16.

In the Table of FIG. 16, for staggered grid block 1 ("SGB1"), a first set of the parameters "(u, v, w, $\epsilon_{x,y,z}$, $\gamma_{xy,yz,zx}$, $\sigma_{x,y,z}$, $\tau_{xy,yz,xz}$, $\phi$, $u_p$, $v_p$, $w_p$)" is generated and displayed on tire Recorder or Display device 44e. Similarly, in the Table of FIG. 16, for staggered grid block 2 ("SGB2"), a second set of the parameters "(u, v, w, $\epsilon_{x,y,z}$, $\gamma_{xy,yz,zx}$, $\sigma_{x,y,z}$, $\tau_{xy,yz,xz}$, $\phi$, $u_p$, $v_p$, $w_p$)" is displayed on the Recorder or Display device 44e.

Similarly, in the Table of FIG. 16, for staggered grid block "n" ("SGBn"), an n-th set of the parameters "(u, v, w, $\epsilon_{x,y,z}$, $\gamma_{xy,yz,zx}$, $\sigma_{x,y,z}$, $\tau_{xy,yz,xz}$, $\phi$, $u_p$, $v_p$, $w_p$)" is generated and displayed on the Recorder or Display device 44e.

Figure 17:
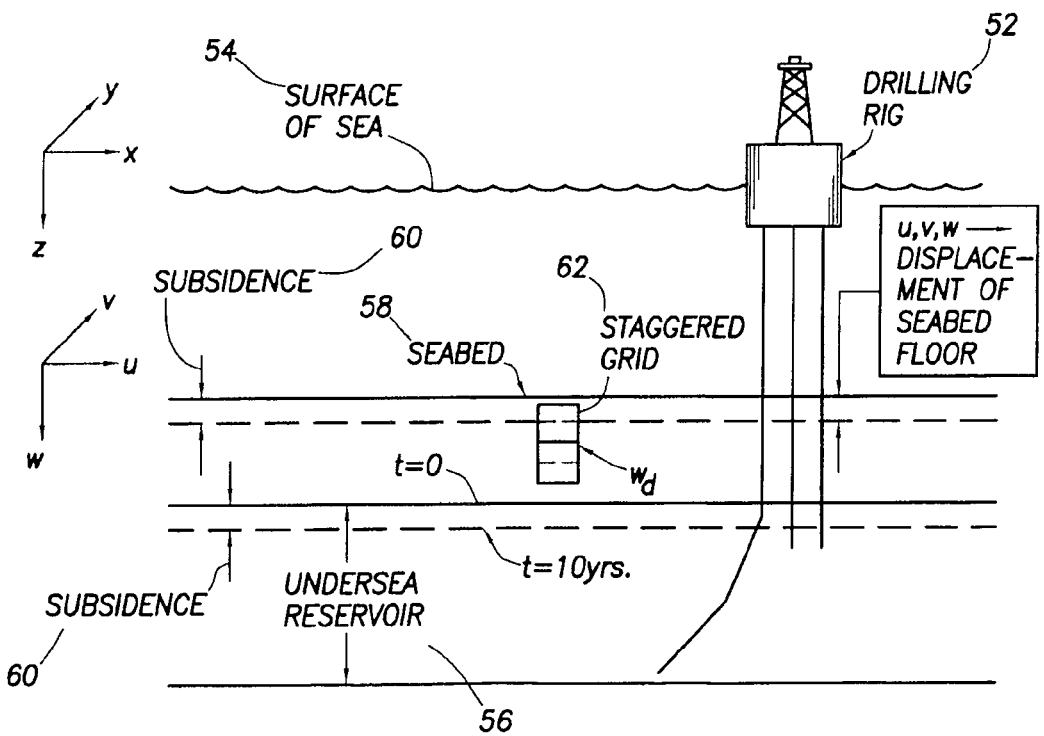
FIG. 17 illustrates how the results generated in FIG. 16 assist m determining subsidence in an oilfield reservoir.

Referring to FIG. 17, when the "Table" of FIG. 16 is generated and displayed on the display device 44e, it is now possible to determine 'Subsidence' in an oilfield reservoir. The term 'subsidence' refers to a failing or 'giving away' of the seabed floor. In FIG. 17, a drilling rig 52 is situated at the surface of the sea 54. The drilling rig 52 withdraws underground deposits of hydrocarbon (e.g., oil) and other fluids (e.g. water) from an undersea reservoir 56 which is located below the seabed floor 58. Over a period of, for example, ten years, a certain amount of subsidence 60 occurs due to the withdrawal of the underground deposits of hydrocarbon and water from, the undersea reservoir 56, the subsidence 60 producing a lowering of the seabed floor 58 a certain amount which corresponds to the subsidence 60.

In FIG. 17, the Parameter Determination Software 50 of FIG. 15 determines the aforementioned subsidence 60 by first determining (via the 'estimating procedure' discussed above) the 'accurate rock displacement parameters (u, v, w)' for the reservoir. These 'accurate rock displacement parameters (u, v, w)' represent the 'movement of the rock,' or, in our example, the displacements of the seabed floor 58 in the (x, y, z) directions over the ten year example period. These displacements of the seabed floor 58 occur as a result of the subsidence 60 (that is, the 'failing' or the 'giving away' of the ground or seabed floor) illustrated in FIG. 17. Therefore, the parameters (u, v, w) represent or characterize 'rock movement in the x, y, and z directions' which, in turn, represent or characterize the 'subsidence 60'. Note that the 'accurate rock displacement parameters (u, v, w)' may include: (1) a displacement that is 'elastic,' and (2) a displacement that is 'plastic' which is denoted ($u_p$, $v_p$, $w_p$). These plastic displacements ($u_p$, $v_p$, $w_p$) were referred to above under 'Description of the Invention' in the section entitled 'Plasticity.' 'Subsidence' is the result of a 'failure' of the rock, for example by crashing, cracking or some other failure mechanism. When the rock has failed, some of its displacement is not recoverable when the original conditions are imposed, and it is the presence of this unrecoverable displacement ($u_p$, $v_p$, $w_p$) that characterizes the 'subsidence' 60. Also note that the undersea formation in FIG. 17 is gridded with structured and unstructured grids, and, as a result, the undersea formation in FIG. 17 is gridded with "staggered grids", as graphically illustrated by the staggered grid 62 in FIG. 17. The flowchart of FIG. 18 illustrates a method, practiced by the Parameter Determination Software 50 of FIG. 15, for determining the 'accurate rock displacement parameters (u, v, w),' which represent these displacements in the (x, y, z) directions due to the subsidence 60.

Figure 18:
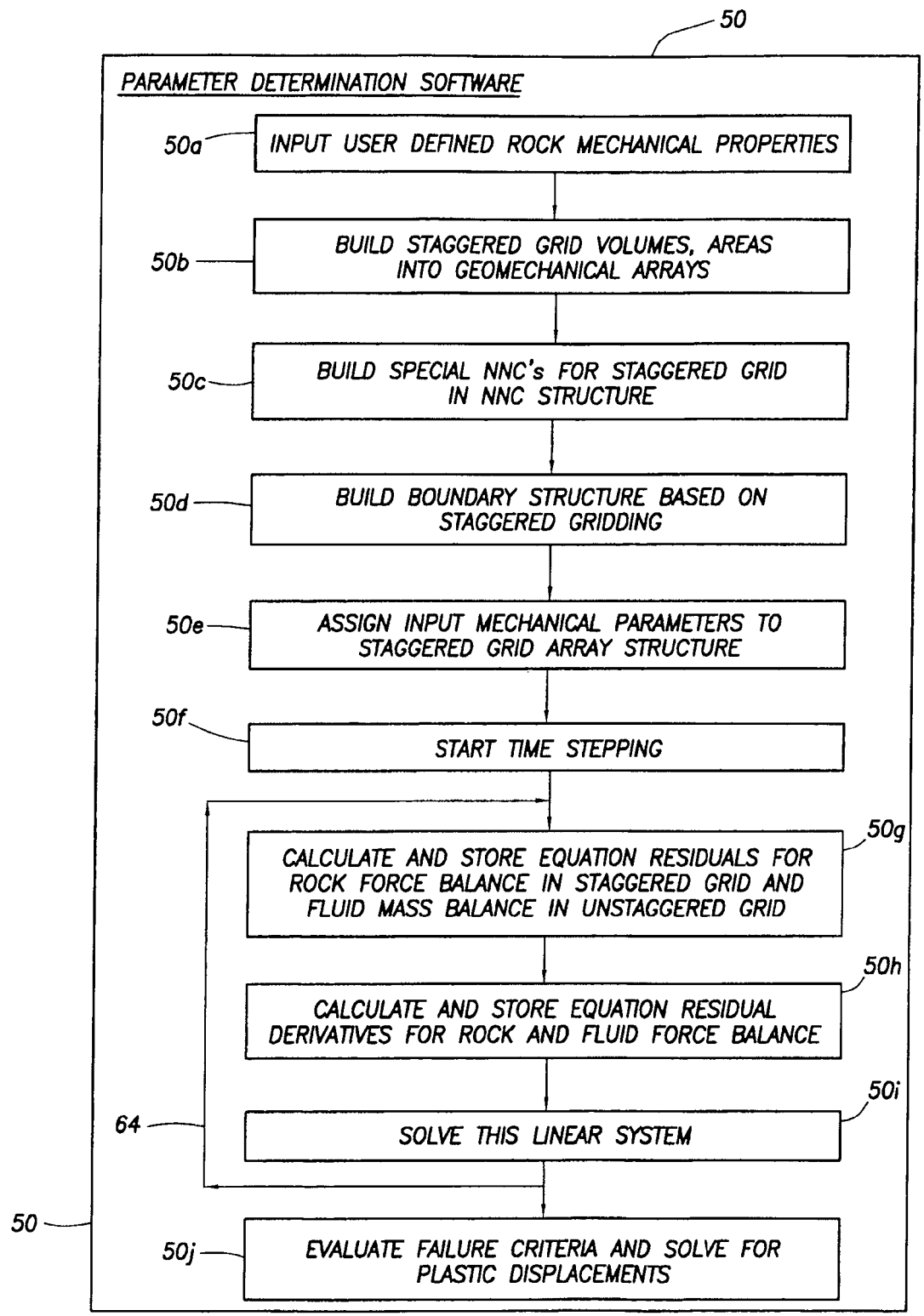
FIG. 18 is a detailed flowchart of the 'Parameter Determination Software' of the present invention.

Referring to FIG. 18, a flowchart is illustrated winch describes the method practiced by the Parameter Determination Software 50 for determining the parameters (u, v, w) representing the rook displacements in the (x, y, z) directions (i.e., the 'movement of the rock') due to the subsidence illustrated in FIG. 17. In FIG. 18, the Parameter Determination Software 50 determines the 'rock movement' parameters (u, v, w) in accordance with the following steps. With reference to FIG. 18, each step of the Parameter Determination software 50 will be discussed in detail below as follows:

1. Input User Defined Rock Mechanical Properties—Block 50a

The user inputs a lot of data, called the "input file," comprising keywords that define the particular simulation that is desired. Part of these keywords represents the mechanical properties of the rock. These "mechanical properties of the rock" are the kind of properties that are needed to drive the equations set forth above known as the "rock momentum balance equations" which are identified above as "equation (1)."

2. Build Staggered Grid Volumes, Areas into Geomechanical Arrays—Block 50b

When the "input file" comprising the "mechanical properties of the rock" is entered, the staggered grid can be built. In this case, we need the staggered grid 'volumes' (how much volume space the staggered, grid would enclose) and the 'areas' (how much surface area the staggered grids would include). These 'volumes' and 'areas' are built into special 'arrays' used for geomechanics calculations.

3. Build Special NNC's for Staggered Grid in NNC Structure—Block 50c

When the aforementioned 'arrays,' used for the geomechanics calculations, are built, the next step is to build special NNC's. The acronym NNC refers to "Non-Neighbor Connections." Because the above defined 'equation (1)' [the "rock momentum balance equations"] are more difficult to solve than the standard reservoir simulation equations, it is necessary to create extra connections on the different grid blocks during the simulation in order to solve 'equation (1)' properly. Therefore, during this step, we build up these "Non-Neighbor Connections" for the staggered grid in a special "Non-Neighbor Connections Structure" or "NNC structure" that has been created inside the simulator. The "NNC structure" is a collection of arrays and special areas that have been set aside inside the simulator.

4. Build Boundary Structure Based on Staggered Gridding—Block 50 d

When the "NNC structure" has been created inside die simulator, it is necessary to build up tire boundaries representing the edges of the simulation or grid. The edges of the grid need this 'boundary structure', which is, in turn, based on the staggered grid. In a particularly preferred embodiment of the present invention, the whole 'boundary structure,' which is a collection or arrays representing the 'boundary conditions,' is set up in order to rigorously solve the above mentioned equations, namely, the "rock momentum balance equations" defined above as 'equation (1).'

5. Assign Input Mechanical Parameters to Staggered Grid Array Structure—Block 50e When the 'boundary structure' has been build based on the staggered gridding, it is necessary to assign input mechanical parameters to the staggered grid array structure. After this is accomplished, the time stepping can commence.

As noted above, in one aspect, the present invention relates to an equilibration technique used optionally to initiate stresses and pore volumes, and if that technique is utilized, it is utilized to solve for rock displacements after the user specified boundary conditions are processed and before time stepping commences as follows. When fraction boundary conditions are applied at the surface of a grid, the reservoir will compress due to displacement of the rock which, in turn, alters bulk and pore volumes. Initial pore volumes in a standard reservoir simulation are calculated from bulk volumes, initial porosities and net-to-gross ratios that are estimated or measured in a reservoir that is already stressed. The role of an initialization step is to allow the application, of traction boundary conditions that will give initial displacements and porosities such that the initial pore volumes, i.e. initial bulk volumes times net-to-gross times initial porosity, are preserved. Otherwise, fluid in place may be substantially altered.

Therefore a rock state, i.e. rock displacements and porosity, must be found which satisfies, after application of the traction boundary conditions, the following:

$$V^e NTG\phi^e = V^o NTG\phi^o = PV^o \quad (14)$$

where $V^e$ is the bulk volume after application of the traction boundary conditions, NTG is the user-specified net-to-gross ratio, $\phi^e$ is the porosity after application of the traction boundary conditions, $V^o$ is the initial bulk volume which is directly calculated from the Cartesian or corner point geometry and $\phi^o$ is the initial porosity as entered by the user. The superscript e denotes equilibration.

Bulk volume after an equilibration step (4) can be written either as $$V^e = V^o(1+\delta\epsilon_b) = V^o(1+\delta\epsilon_{xx}+\delta\epsilon_{yy}+\delta\epsilon_{zz}) \quad (15)$$

or $$V^e = V^o(1+\delta\epsilon_{xx})(1+\delta\epsilon_{yy})(1+\delta\epsilon_{zz}) \quad (16)$$

where $\delta\epsilon_{xx}$, $\delta\epsilon_{yy}$, and $\delta\epsilon_{zz}$ are changes in strains in the x, y and z directions. Either equations (6) or (7) can used in conjunction with a porosity-stress model that describes conservation of rock volume $$V^{n+1}(1-\phi^{n+1}) = V^n(1-\phi^n). \quad (17)$$

as described above. Equation (15) is used with a second porosity-stress model that describes a linearized conservation of rock mass $$\delta\phi = \left(1 - \phi^n - \frac{C_R}{C_{bc}}\right)(\delta\epsilon_b + C_R \delta P) \quad (18)$$

that is derived in Han, G., and Dusseault, M. B., "Description of fluid flow around a wellbore with stress-dependent porosity and permeability," Journal of Petroleum Science and Engineering, 40(1/2); 1-16, 2003, which is hereby incorporated into this specification in its entirety by this specific reference thereto. A finite element stress calculation provides $\delta\epsilon_{xx}$, $\delta\epsilon_{yy}$ and $\delta\epsilon_{zz}$ as the change in derivatives of the displacement distribution at the cell centers while these are derived in the finite difference method from $$\delta\varepsilon_{xx} = \frac{\left(\begin{array}{c} U(I+1, n+1) - U(I, n+1) - \\ U(I+1, n) + U(I, n) \end{array}\right)}{DX(n)}$$

$$\delta\varepsilon_{yy} = \frac{\left(\begin{array}{c} V(J+1, n+1) - V(J, n+1) - \\ V(J+1, n) + V(J, n) \end{array}\right)}{DY(n)} \quad (19)$$

$$\delta\varepsilon_{zz} = \frac{\left(\begin{array}{c} W(K+1, n+1) - W(K, n+1) - \\ W(K+1, n) + W(K, n) \end{array}\right)}{DZ(n)}$$

where U, V and W are rock displacements in the x, y and z directions I, J, and K are cell indices in the coordinate directions, n is the timestep number, and DX, DY and DZ are cell lengths at time step n.

As set out above, the equilibration step solves for rock displacements after the user specified boundary conditions are processed and before timestepping begins. Set the displacements at the initial time step n=0 to be these displacements. If the simulator takes a timestep with no change in traction boundary conditions and no change in pore pressure, then the residuals of the rock force balance equations will remain zero, hence displacements at time step 1 will be unchanged. Then the change in strains is zero, bulk volumes remained unchanged as seen in (15) or (16) and the porosity is unchanged from (17) or (18). Therefore pore volumes remain unchanged and the initial stress and pore pressure state is in equilibrium.

6. Start Time Stepping—Block 50f

When the input mechanical parameters are assigned to the staggered grid array structure, the simulator will now start 'time stepping.' The simulator 46b of FIG. 15 will time step forward in time and project into the future to determine what will happen.

7. Calculate and Store Equation Residuals for Rock and Fluid Force Balance in Staggered Grid—Block 50g

The first thing that is accomplished after the 'time stepping' is commenced is to calculate and store the equation residuals for the 'rock and fluid force balance.' The 'rock and fluid force balance' refers to 'equation (1),' that is, the "rock momentum balance equations," which are set forth above and are duplicated below as follows:

$$\frac{\partial \sigma_x}{\partial x} + \frac{\partial \tau_{yx}}{\partial y} + \frac{\partial \tau_{zx}}{\partial z} + F_x + P_x = 0 \quad (1)$$

$$\frac{\partial \sigma_y}{\partial y} + \frac{\partial \tau_{xy}}{\partial x} + \frac{\partial \tau_{xy}}{\partial z} + F_y + P_y = 0$$

$$\frac{\partial \sigma_z}{\partial z} + \frac{\partial \tau_{xz}}{\partial x} + \frac{\partial \tau_{yz}}{\partial y} + F_z + P_z = 0.$$

The simulator will actually calculate the "rock momentum balance equations" representing 'equation (1),' and the residuals are exactly as set forth in 'equation (1).' Referring to 'equation (1)' set forth above (that is, the "rock momentum balance equations"), the term "residual" can be defined as follows: "How different from '0' is the left-hand side of the above referenced 'equation (1)'?". The objective is to try to make the left-hand side of 'equation (1)' equal to '0,' which is the right-hand side of the 'equation (1).' The simulator 46b of FIG. 15 will therefore "calculate the 'rock momentum balance equations' representing 'equation (1),' that is, the simulator 46b will adjust the parameters (u, v, w) and porosity and other resultant variables as set forth above in equations (2) and (3), until the left-hand side of the above 'equation (1)' is equal to the right-hand side of 'equation (1),' where the right-hand side of 'equation (1)' is equal to '0.' Therefore, we know that we have solved tire above referenced "rock momentum balance equations" of 'equation (1)' when the left-hand side of 'equation (1)' is equal to '0.' We find out how far away from '0' we are by calculating the 'residuals.'

8. Calculate and Store Equation Residual Derivatives for Rock and Fluid Force Balance—Block 50h

At this point, we calculate and store the equation residual derivatives (which are required for the Newton gradient search), which derivatives will drive the "rock momentum balance equations" residuals [identified as 'equation (1)'] to '0.' At this point, we have: (1) 'residuals,' and we have (2) 'derivatives of these residuals.'

9. Solve this Linear System—Block 50i

Now that we know:

(1) the 'Residuals', and (2) the 'Derivatives of these Residuals,' we can now solve this whole 'system of linear equations' representing the 'rock momentum balance equations' of 'equation (1)' which are set forth again below, as follows:

$$\frac{\partial \sigma_x}{\partial x} + \frac{\partial \tau_{yx}}{\partial y} + \frac{\partial \tau_{zx}}{\partial z} + F_x + P_x = 0 \quad (1)$$

$$\frac{\partial \sigma_y}{\partial y} + \frac{\partial \tau_{xy}}{\partial x} + \frac{\partial \tau_{xy}}{\partial z} + F_y + P_y = 0$$

$$\frac{\partial \sigma_z}{\partial z} + \frac{\partial \tau_{xz}}{\partial x} + \frac{\partial \tau_{yz}}{\partial y} + F_z + P_z = 0.$$

The above referenced 'rock momentum balance equations' of 'equation (1)' are solved together and simultaneously with the standard reservoir simulation equations.

When the above referenced 'rock momentum balance equations' of 'equation (1)' are solved, the "u", "v", and "w" displacement parameters, representing movement of the rock, are determined, where:

u=rock displacement in the x-direction
v=rock displacement in the y-direction
w=rock displacement in the z-direction When the displacement parameters (u, v, w) are determined, the above referenced 'equation (3)' is used to determine "$\epsilon_{x,y,z}$" (the 'x,y,z elongation strains') and "$\gamma_{xy,yz,zx}$" (the 'shear strains'), since "$\epsilon_{x,y,z}$" and "$\gamma_{yx,yz,zx}$" are function of "u", "v", and "w", as follows:

$$\varepsilon_x = \frac{\partial u}{\partial x} \quad (3)$$

$$\varepsilon_y = \frac{\partial v}{\partial y}$$

$$\varepsilon_z = \frac{\partial w}{\partial z}$$

$$\gamma_{xy} = \frac{\partial u}{\partial y} + \frac{\partial v}{\partial x}$$

$$\gamma_{yz} = \frac{\partial v}{\partial z} + \frac{\partial w}{\partial y}$$

$$\gamma_{zz} = \frac{\partial w}{\partial x} + \frac{\partial u}{\partial z}.$$

When "$\epsilon_{x,y,z}$" and "$\gamma_{xy,yz,zx}$" are determined from 'equation (3),' the above referenced 'equation (2)' is used to determine "$\sigma_{x,y,z}$" (the 'elastic normal rock stress in x,y,z directions') and "$\tau_{xy,yz,xz}$" (the 'elastic shear stress') since "$\sigma_{x,y,z}$" and "$\tau_{xy,yz,xz}$" are a function of "$\epsilon_{x,y,z}$" and "$\gamma_{xy,yz,zx}$" in 'equation (2)' as follows:

$\sigma_x = 2G\epsilon_x + \lambda(\epsilon_x + \epsilon_y + \epsilon_z)$ $\sigma_y = 2G\epsilon_y + \lambda(\epsilon_x + \epsilon_y + \epsilon_z)$ $\sigma_z = 2G\epsilon_z + \lambda(\epsilon_x + \epsilon_y + \epsilon_z)$ $\tau_{xy} = G\gamma_{xy}$ $\tau_{yz} = G\gamma_{yz}$ $\tau_{zx} = G\gamma_{zx} \quad (2)$ When the "$\sigma_{x,y,z}$" and "$\tau_{xy,yz,xz}$" are determined from 'equation (2),' the above referenced 'equation (1)' is solved, since 'equation (1)' is a function of "$\sigma_{x,y,z}$" and "$\tau_{xy,yz,xz}$", as follows:

$$\frac{\partial \sigma_x}{\partial x} + \frac{\partial \tau_{yx}}{\partial y} + \frac{\partial \tau_{zx}}{\partial z} + F_x + P_x = 0 \quad (1)$$

$$\frac{\partial \sigma_y}{\partial y} + \frac{\partial \tau_{xy}}{\partial x} + \frac{\partial \tau_{xy}}{\partial z} + F_y + P_y = 0$$

$$\frac{\partial \sigma_z}{\partial z} + \frac{\partial \tau_{xz}}{\partial x} + \frac{\partial \tau_{yz}}{\partial y} + F_z + P_z = 0.$$

The result of these calculations will produce the Table of FIG. 16. A reservoir engineer would be interested in knowing each of the quantities shown in the Table of FIG. 16.

10. Evaluate Failure Criteria and Solve for Plastic Displacements—block 50*j*

A final step is required if the reservoir engineer has specified regions in the step 50*a* in FIG. 18 where the rock may fail. In this case, the final "$\sigma_{x,y,z}$" and "$\tau_{xy,yz,xz}$" are used to evaluate the chosen failure criterion which may be Mohr-Coulomb as referred to above in the section 'Description of the Invention' subsection Plasticity. If the failure criterion is exceeded, then a set of equations is set up to solve for the plastic displacements, denoted ($u_p$, $v_p$, $w_p$) above, which will force the failure criterion residual to be exactly zero. This system is set op and solved exactly as described above with the exception that the residuals are now the failure criterion residuals winch are driven, to mm instead of the equation (1) residuals. This step is 50*j* in FIG. 18.

In the above-described alternative method for coupling elastic or non-elastic change to the stress calculation, a third alternative to the rock volume or mass conservation equations (17) and (18) that may violate the conservation law because of compaction effects is created. The governing (rock balance) residual equation will then be $$V^{n+1} NTG \phi^{n+1} = PV_{tab}(P^{n+1}) \quad (20)$$

where $PV_{tab}(P^{n+1})$ is the tabulated rock compaction curve supplied by the standard reservoir simulator. This equation will determine $\phi^{n+1}$ and is compatible with the various stress/fluid flow coupling methods discussed above. For example, this coupling may be an IMPES coupled scheme in which an implicit solution of the fluid flow IMPES pressure equation, tire rock momentum and the rock balance equation (20) is found. Similarly, a partial coupling will take the latest pore pressures from the standard simulator and simultaneously solve the rock momentum residuals and rock balance residual equation (20). This alternative coupling method allows a solution of the rock force balance equations, fluid flow equations, and rock balance equation which accounts for compaction effects, including water-induced compaction and hysteresis, without the need to solve the highly non-linear plastic failure equations.

In FIG. 18, when the 'system of linear equations' set form above as 'equation (1)' has been solved, referring to the 'feed-back loop' 64 in FIG. 18, the simulator 46*b* of FIG. 15 continues its 'time stepping' by repeating the implementation of blocks 50*g*, 50*h*, 50*i* and 50*j* in FIG. 18.

When the flow chart of FIG. 18 is executed, the 'result' is a solution to a problem, which a reservoir engineer would want to solve, in which you have certain boundary conditions applied to the rock, boundary conditions applied to 'equation (1),' and boundary conditions applied to the reservoir simulation equations. For example, in the North Sea, problems with 'subsidence' exist. The term 'subsidence' is a situation where the ground actually 'gives-way' or 'fails.' The above calculation would be applied to this 'subsidence' problem.

The above type of calculation, which represents a solution to the above referenced 'Elastic Stress Equations' using 'staggered gridding,' is used to handle the 'more difficult' fields, such as the fields having the 'subsidence' problem of FIG. 17.

In summary, rock will initially behave elastically because it is in equilibrium and there are no external forces. Elastic behavior means that the rock behaves like a spring; that is, you can push it (i.e., apply force) and it will return exactly to its original position when you stop pushing. Subsidence happens when the rock is pushed beyond its own strength. For example, in a particular reservoir where certain wells are withdrawing fluids, the rock may no longer have the support of the water pressure, and the weight of the overburden will become high enough to cause the rock to fail. If the rock fails, e.g. by crashing or cracking, then, it no longer moves elastically but rather moves plastically. This plastic movement is what is referred to as "subsidence." We know this will occur because we solve 'equation (1)', which are the rock momentum balance equations (otherwise known as rock force balance equations). If these equations tell us that the forces become too large in one direction relative to the forces in another direction at some particular point in time, then, we know that failure will occur. At this point, we further solve a final set of equations which will calculate the plastic displacements. "Derivatives" are needed because these equations are nonlinear.

REFERENCES

The following references (1 through 26) are incorporated by reference into the specification of this application:
1. Hansen, K. S., Prats, M., Chan, C. K., "Finite-element modeling of depletion-induced reservoir compaction and surface subsidence in the South Belridge oil field, California", SPE 26074, presented at the Western Regional Meeting, Anchorage, Ak., U.S.A., 26-28 May, 1993.
2. Berumen, S., Cipolla, C, Finkbeiner, T., Wolhart, S., Rodriguez, F., "Integrated reservoir geomechanics techniques in the Burgos Basin, Mexico: An improved gas reservoirs management", SPE 59418 presented at the 2000 SPE Asia Pacific Conference on Integrated Modelling for Asset Management, Yokohama, Japan, 25-26 April, 2000.
3. Kojic, M., Cheatham, J. B., "Theory of plasticity of porous media with fluid flow", SPE 4394, printed in *Transactions*, volume 257, June 1974.
4. Kojic, M., Cheatham, J. B., "Analysis of the influence of fluid flow on the plasticity of porous rock under an axially symmetric punch", SPE 4243, printed in *Transactions*, volume 257, June 1974.
5. Corapcioglu, M. Y., Bear, J., "Land Subsidence", presented at the NATO Advanced Study Institute on Mechanics of Fluids in Porous Media, Newark Del., U.S.A., 18-27 July, 1982.
6. Demirdzic, I., Martinovic, D., "Finite volume method for thermo-elasto-plastic stress analysis", Computer Method In Applied Mechanics and Engineering 109, 331-349, 1993.
7. Demirdzic, I., Muzaferija, S., "Finite volume method for stress analysis on complex domains", International Journal for Numerical Methods in Engineering, vol. 37, 3751-3766, 1994.
8. Settari, A., Walters, D. A., "Advances in coupled geomechanical and reservoir modeling with applications to reservoir compaction", SPE 51927 presented at the 1999 SPE Reservoir Simulation Symposium, Houston Tex., 14-17 Feb., 1999.
9. Heffer, K. J., Koutsabeloulis, N. C, Wong, S. K., "Coupled geomechanical, thermal and fluid flow modelling as an aid to improving waterflood sweep efficiency", Eurock '94, Balkema, Rotterdam, 1994.
10. Gutierrez, M., and Lewis, R. W., "The role of geomechanics in reservoir simulation". Proceedings Eurock '98, Vol. 2, 439-448, 1998.
11. Geertsma, J., "Land subsidence above compacting oil aid gas reservoirs", *JPT* (1973), 734-744.
12. Holt R. E., "Permeability reduction induced by a nonhydrostatic stress field", *SPE Formation Evauation*, 5, 444-448.
13. Rhett, W. and Teufel, L. W., "Effect of reservoir stress path on compressibility and permeability of sandstones", presented at SPE $67^{th}$ Annual Technical conference and Exhibition, SPE 24756, Washington, D.C., October, 1992.
14. Ferfera, F. R., Sarda, J. P., Bouteca, M., and Vincke, O., "Experimental study of monophasic permeability changes under various stress paths", *Proceedings of $36^{th}$ U.S. Rock Mechanics Symposium*, Kim (ed.), Elsevier, Amsterdam.
15. Teufel, L. W., Rhett, W., and Farrell, H. E., "Effect of reservoir depletion and pore pressure drawdown on in situ stress and deformation in the Ekofisk field, North Sea", *Rock Mechanics as a Multidisciplinary Science*, Roegiers (ed.), Balkema, Rotterdam.
16. Teufel, L. W., and Rhett, W., "Geomechanical evidence for shear failure of chalk during production of the Ekofisk field", SPE 22755 presented at the 1991 SPE $66^{th}$ Annual Technical Conference and Exhibition, Dallas, October, 6-9.
17. Chou, C. C., Pagano, N. J., "Elasticity, Tensor, Dyadic, and Engineering Approaches", Dover Publications, Inc., New York, 1967.
18. Budynas, R. G., "Advanced Strength and Applied Stress Analysis: Second Edition", McGraw-Hill Book Co., 1999.
19. Naccache, P. F., N., "A fully implicit thermal simulator", SPE 37985 presented at the SPE Reservoir Simulation Symposium, September 1997.
20. Aziz, K., Settari, A., "Petroleum Reservoir Simulation", Applied Science Publ., New York City (1979).
21. Terzaghi, K., "Erdbaumechanik auf bodenphysikalischer Grundlage", Franz Deuticke, Vienna, 1925.
22. Davies, J. P., Davies, D. K., "Stress-dependent permeability: characterization and modeling", SPE 56813 presented at tire 1999 SPE Annual Technical Conference and Exhibition held in Houston, Tex., 3-6 Oct., 1999.
23. Yale, D. P., Crawford, B., "Plasticity and permeability in carbonates; dependence on stress path and porosity", SPE/ISRM 47582, presented at the SPE/ISRM Eurock '98 Meeting, Trondheim, Norway, 8-10 Jul., 1998.
24. Appleyard, J. R., Cheshire, I. M., "Nested factorization", SPE 12264 presented at the SPE Reservoir Simulation Symposium, San Francisco, Nov. 15-18, 1983.
25. Settari, A., Mounts. F. M., "A coupled reservoir and geomechanical simulation system", SPE 50939, SPE Journal, 219-226, September, 1998.
26. ABAQUS Theory Manual, Hibbitt, Karlsson & Sorensen, Inc., 1995.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for reservoir simulation, comprising:

applying, using a processor, traction boundary conditions at a surface of a grid representing a subterranean reservoir; and finding, using the processor, a rock state, representing initial rock displacements and porosity in the grid, that satisfies a first equation of $V^e NTG \phi^e = V^0 NTG \phi^0 = PV^0$ where $V^e$ is a bulk volume after application of the traction boundary conditions, NTG is a user-specified net-to-gross ratio, $\phi^e$ is porosity after application of the traction boundary conditions, $V^0$ is an initial bulk volume which is directly calculated from Cartesian or corner point geometry, $\phi^0$ is an initial porosity, and P is pore pressure;

initializing, using the processor, the grid based on the rock state to generate an initialized grid;

determining, using the processor, a set of rock displacements based on the initialized grid and mechanical properties measured by a sensor disposed about the subterranean reservoir; and generating, using the processor, a simulation result based on the rock displacements, wherein an operation in the subterranean reservoir is performed based on the simulation result.

2. The method of claim 1, wherein the bulk volume $V^e$ is expressed in accordance with a second equation in a form of $V^e = V^0(1+\delta\epsilon_b) = V^0(1+\delta\epsilon_{xx}+\delta\epsilon_{yy}+\delta\epsilon_{zz})$ or $V^e = V^0(1+\delta\epsilon_{xx})(1+\delta\epsilon_{yy})(1+\delta\epsilon_{zz})$, where $\delta\epsilon_{xx}$, $\delta\epsilon_{yy}$ and $\delta\epsilon_{zz}$ are changes in strains in x, y and z directions in the grid representing the subterranean reservoir.

3. The method of claim 2, wherein said second equation is used in conjunction with a porosity-stress model that describes conservation of rock volume as $V^{n+1}(1-\phi^{n+1}) = V^n(1-\phi^n)$.

4. The method of claim 3, wherein a finite element stress calculation provides $\delta\epsilon_{xx}$, $\delta\epsilon_{yy}$ and $\delta\epsilon_{zz}$ as changes in derivatives of a displacement distribution at cell centers which are derived in a finite difference method from $$\delta\varepsilon_{xx} = \frac{(U(I+1, n+1) - U(I, n+1) - U(I+1, n) + U(I, n))}{DX(n)}$$

$$\delta\varepsilon_{yy} = \frac{(V(J+1, n+1) - V(J, n+1) - V(J+1, n) + V(J, n))}{DY(n)}$$

$$\delta\varepsilon_{zz} = \frac{\left(\begin{array}{c} W(K+1, n+1) - W(K, n+1) - \\ W(K+1, n) + W(K, n) \end{array}\right)}{DZ(n)}$$

where U, V and W are rock displacements in the x, y and z directions, I, J and K are cell indices in coordinate directions, n is a timestep number, and DX, DY and DZ are cell lengths at time step n, wherein the cell centers, cell indices, and cell lengths are parameters of the grid representing the subterranean reservoir, wherein the timestep is a parameter of the reservoir simulator software.

5. A non-transitory computer readable medium tangibly embodying a program of instructions, when executed by the computer to practice an equilibration method for a reservoir simulator software to initialize stresses and pore volumes and solve for rock displacements in a reservoir, comprising functionality for:

determining a rock state, representing initial rock displacements and porosity, which satisfies, after application of traction boundary conditions at a surface of a grid representing the reservoir in the reservoir simulator software, a first equation of $V^e NTG \phi^e = V^0 NTG \phi^0 = PV^0$ where $V^e$ is a bulk volume after application of the traction boundary conditions, NTG is a user-specified net-to-gross ratio, $\phi^e$ is porosity after application of the traction boundary conditions, $V^0$ is an initial bulk volume which is directly calculated from a Cartesian or corner point geometry, $\phi^0$ is an initial porosity, superscript e denotes equilibration, and P is pore pressure;

initializing the grid based on the rock state to generate an initialized grid;

determining the rock displacements based on the initialized grid and mechanical properties measured by a sensor disposed about the subterranean reservoir; and generating a simulation result based on the rock displacements, wherein an operation in the reservoir is performed based on the simulation result.

6. The computer readable medium of claim 5, wherein the bulk volume $V^e$ is expressed in accordance with a second equation in a form of $V^e = V^0(1+\delta\epsilon_b) = V^0(1+\delta\epsilon_{xx}+\delta\epsilon_{yy}+\delta\epsilon_{zz})$ or $V^e = V^0(1+\delta\epsilon_{xx})(1+\delta\epsilon_{yy})(1+\delta\epsilon_{zz})$, where $\delta\epsilon_{xx}$, $\delta\epsilon_{yy}$ and $\delta\epsilon_{zz}$ are changes in strains in x, y and z directions in the grid representing the reservoir.

7. The non-transitory computer readable medium of claim 6, wherein said second equation is used in conjunction with a porosity-stress model that describes conservation of rock volume as $V^{n+1}(1-\phi^{n+1}) = V^n(1-\phi^n)$.

8. The non-transitory computer readable medium of claim 7, wherein a finite element stress calculation provides $\delta\epsilon_{xx}$, $\delta\epsilon_{yy}$ and $\delta\epsilon_{zz}$ as changes in derivatives of a displacement distribution at cell centers which are derived in a finite difference method from $$\delta\varepsilon_{xx} = \frac{(U(I+1, n+1) - U(I, n+1) - U(I+1, n) + U(I, n))}{DX(n)}$$

$$\delta\varepsilon_{yy} = \frac{(V(J+1, n+1) - V(J, n+1) - V(J+1, n) + V(J, n))}{DY(n)}$$

$$\delta\varepsilon_{zz} = \frac{\left(\begin{array}{c} W(K+1, n+1) - W(K, n+1) - \\ W(K+1, n) + W(K, n) \end{array}\right)}{DZ(n)}$$

where U, V and W are rock displacements in x, y and z directions, I, J and K are cell indices in coordinate directions, n is a timestep number, and DX, DY and DZ are cell lengths at time step n, wherein the cell centers, cell indices, and cell lengths are parameters of the grid representing the subterranean reservoir, wherein the timestep is a parameter of the reservoir simulator software.

9. A non-transitory computer readable medium tangibly embodying a program of instructions, when executed by a computer to conduct a reservoir simulation, comprising functionality for:

applying traction boundary conditions at a surface of a grid representing a subterranean reservoir; and finding a rock state, representing initial rock displacements and porosity in the grid, that satisfies a first equation of $V^e NTG \phi^e = V^0 NTG \phi^0 = PV^0$ where $V^e$ is a bulk volume after application of the traction boundary conditions, NTG is a user-specified net-to-gross ratio, $\phi^e$ is porosity after application of the traction boundary conditions, $V^0$ is an initial bulk volume which is directly calculated from Cartesian or corner point geometry, $\phi^0$ is an initial porosity, and P is pore pressure;

initializing the grid based on the rock state to generate an initialized grid;

determining a set of rock displacements based on the initialized grid and mechanical properties measured by a sensor disposed about the subterranean reservoir; and generating a simulation result based on the rock displacements, wherein an operation in the subterranean reservoir is performed based on the simulation result.

10. The non-transitory computer readable medium of claim 9, wherein the bulk volume $V^e$ is expressed in accordance with a second equation in a form of $V^e=V^0(1+\delta\epsilon_b)=V^0(1+\delta\epsilon_{xx}+\delta\epsilon_{yy}+\delta\epsilon_{zz})$ or $V^e=V^0(1+\delta\epsilon_{xx})(1+\delta\epsilon_{yy})(1+\delta\epsilon_{zz})$, where $\delta\epsilon_{xx}$, $\delta\epsilon_{yy}$ and $\delta\epsilon_{zz}$ are changes in strains in x, y and z directions in the grid representing the subterranean reservoir.

11. The non-transitory computer readable medium of claim 10, wherein said second equation is used in conjunction with a porosity-stress model that describes conservation of rock volume as $V^{n+1}(1-\phi^{n+1})=V^n(1-\phi^n)$.

12. The non-transitory computer readable medium of claim 11, wherein a finite element stress calculation provides $\delta\epsilon_{xx}$, $\delta\epsilon_{yy}$ and $\delta\epsilon_{zz}$ as changes in derivatives of a displacement distribution at cell centers which are derived in a finite difference method from $$\delta\varepsilon_{xx} = \frac{(U(I+1,n+1) - U(I,n+1) - U(I+1,n) + U(I,n))}{DX(n)}$$

$$\delta\varepsilon_{yy} = \frac{(V(J+1,n+1) - V(J,n+1) - V(J+1,n) + V(J,n))}{DY(n)}$$

$$\delta\varepsilon_{zz} = \frac{(W(K+1,n+1) - W(K,n+1) - W(K+1,n) + W(K,n))}{DZ(n)}$$

where U, V and W are rock displacements in the x, y and z directions, I, J and K are cell indices in coordinate directions, n is a timestep number, and DX, DY and DZ are cell lengths at time step n, wherein the cell centers, cell indices, and cell lengths are parameters of the grid representing the subterranean reservoir, wherein the timestep is a parameter of the reservoir simulator software.

* * * * *